United States Patent
Fischer

(10) Patent No.: US 7,683,831 B2
(45) Date of Patent: Mar. 23, 2010

(54) GLOBAL NAVIGATION SATELLITE SYSTEM

(75) Inventor: Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 11/686,904

(22) Filed: Mar. 15, 2007

(65) Prior Publication Data

US 2008/0088506 A1 Apr. 17, 2008

Related U.S. Application Data

(63) Continuation-in-part of application No. 11/621,935, filed on Jan. 10, 2007.

(60) Provisional application No. 60/782,955, filed on Mar. 15, 2006.

(51) Int. Cl.
*G01S 1/00* (2006.01)
(52) U.S. Cl. .............. 342/357.06; 342/357.01
(58) Field of Classification Search ............ 342/357.06, 342/357.01
See application file for complete search history.

(56) References Cited

U.S. PATENT DOCUMENTS

| | | | |
|---|---|---|---|
| 5,812,087 A | 9/1998 | Krasner | |
| 5,841,396 A | 11/1998 | Krasner | |
| 5,874,914 A | 2/1999 | Krasner | |
| 5,945,944 A | 8/1999 | Krasner | |
| 5,999,124 A | 12/1999 | Sheynblat | |
| 6,061,018 A | 5/2000 | Sheynblat | |
| 6,208,290 B1 | 3/2001 | Krasner | |
| 6,215,442 B1 | 4/2001 | Sheynblat et al. | |
| 7,095,368 B1 * | 8/2006 | van Diggelen | 342/357.01 |
| 2002/0190898 A1 | 12/2002 | Abraham et al. | |

FOREIGN PATENT DOCUMENTS

WO 07082038 7/2007

OTHER PUBLICATIONS

GPS Joint Program Office: "NAVSTAR Global Positioning System. Interface Specification. IS.-GPS-200. Revision D," ARINC Engineering Services, LLC, Dec. 7, 2004, pp. 187-192, XP002445884, El Segundo, CA 90245, USA.

(Continued)

*Primary Examiner*—Thomas H Tarcza
*Assistant Examiner*—Harry Liu
(74) *Attorney, Agent, or Firm*—Andrea L. Mays; Jimmy Cheng

(57) ABSTRACT

Each of a first and a second navigation satellite system (NSS) are adapted to operate according to a first and a second specification, respectively, and each includes a first and a second plurality of space vehicles (SV), respectively. Each of the first and the second plurality of SVs are adapted to be identified by a first and a second plurality of unique corresponding identifications (IDs), respectively. A processor is adapted to receive and identify a first plurality of corresponding signals transmitted from the first plurality of SVs in response to the first plurality of unique corresponding IDs. The processor is adapted to receive and identify a second plurality of corresponding signals transmitted from the second plurality of SVs in response to the second plurality of unique corresponding IDs. The processor is adapted to determine position location information in response to receiving and identifying the first plurality of corresponding signals and the second plurality of corresponding signals.

44 Claims, 21 Drawing Sheets

OTHER PUBLICATIONS

Hahn, J. et al.: "Implementation of the GPS to Galileo Time Offset (GGTO)" Frequency Control Symposium and Exposition, 2005. Proceedings of the 2005 IEEE tnternational Vancouver, BC, Canada, Aug. 29-31, 2005, Piscataway, NJ, USA, IEEE, Aug. 29, 2005 (2005).

Moudrak, A. et al.: "GPS Gailleo Time Offset: How It Affects Positioning Accuracy and How to Cope with it," ION GNSS 17th Sep. 24, 2004, pp. 660-669, XP002445883, Long Beach, CA "GPS, Galileo and the time offset," p. 661.

Schmid, et al.: "Combined Galileo/GPS Architecture for Enhanced Sensitivity Reception," AEU International Journal of Electronics and Communications, Elsevier, Jena, DE, vol. 59, No. 5, Jul. 15, 2005, pp. 297-306.

3GPP TR 23.835 V1.0.0 (Jun. 2003) 3rd Generation Partnership Project; Technical Specification Group Services and System Aspects; Location Services (LCS); Study into Applicability of GALILEO in LCS Release 6.

3GPP TS 23.271 V7,7.0 (Dec. 2008) 3rd Generation Partnership Project; Technical Specification Group Services and System Aspects, Aspects; Functional stage 2 description of Location Services (LCS)( Release 7).

3GPF TS 25,305 V7,3.0 (Jun. 2006) 3rd Generation Partnership Project; Technical Specification Group Radio Access Network; Stage 2 functional specification of User Equipment (UE) positioning in UTRAN (Release 7).

3GPP TS 43.059 V7.2.0 (Apr. 2006) 3rd Generation Partnership Project; Technical Specification Group GSM/EDGE Radio Access Network; Functional stage 2 description of Location Serviecs (LCS) in GERAN (Release 7).

3GPP TS 44.031 V7.2 0 (Nov. 2005) 3rd Generation Partnership Project; Technical Specification Group GSM Edge Radio Access Network; Location Services (LCS); Mobile Station (MS) - Serving Mobile Location Center (SMCL) Radio Resource Los Protocol (RRLP)(Release 7).

3GPP2 C.S0022-0-1, 3rd Generation Partnership Project 2: Position Determination Service Standard for Dual Mode Spread Spectrum Systems, Addendum.

ETSI TS 122 071 V7,4.0 (Dec. 2005) Digital Cellular Telecommunications System (Phase 2+); Universal Mobile Telecommunications System (UMTS); Location Services (LCS); Service Description; Stage 1 (3GPP TS 22.071 Version 7.4.0 Release 7).

ETSI TS 144 031 V6.8.0 (Jul. 2005) Digital Cellular Telecommunications System (Phase 2+); Location Services (LCS); Mobile Station (MS) - Service Mobile Location Centre (SMLC) Radio Resource Los Protocol (RRLP)(3GPP TS 44.031 version 6.6.0 Release 6).

International Search Report, PCT/US2007/064111 - International Search Authority - European Patent Office, Aug. 20, 2007.

Written Opinion, PCT/US2007/064111 - International Search Authority - European Patent Office, Aug. 20, 2007.

* cited by examiner

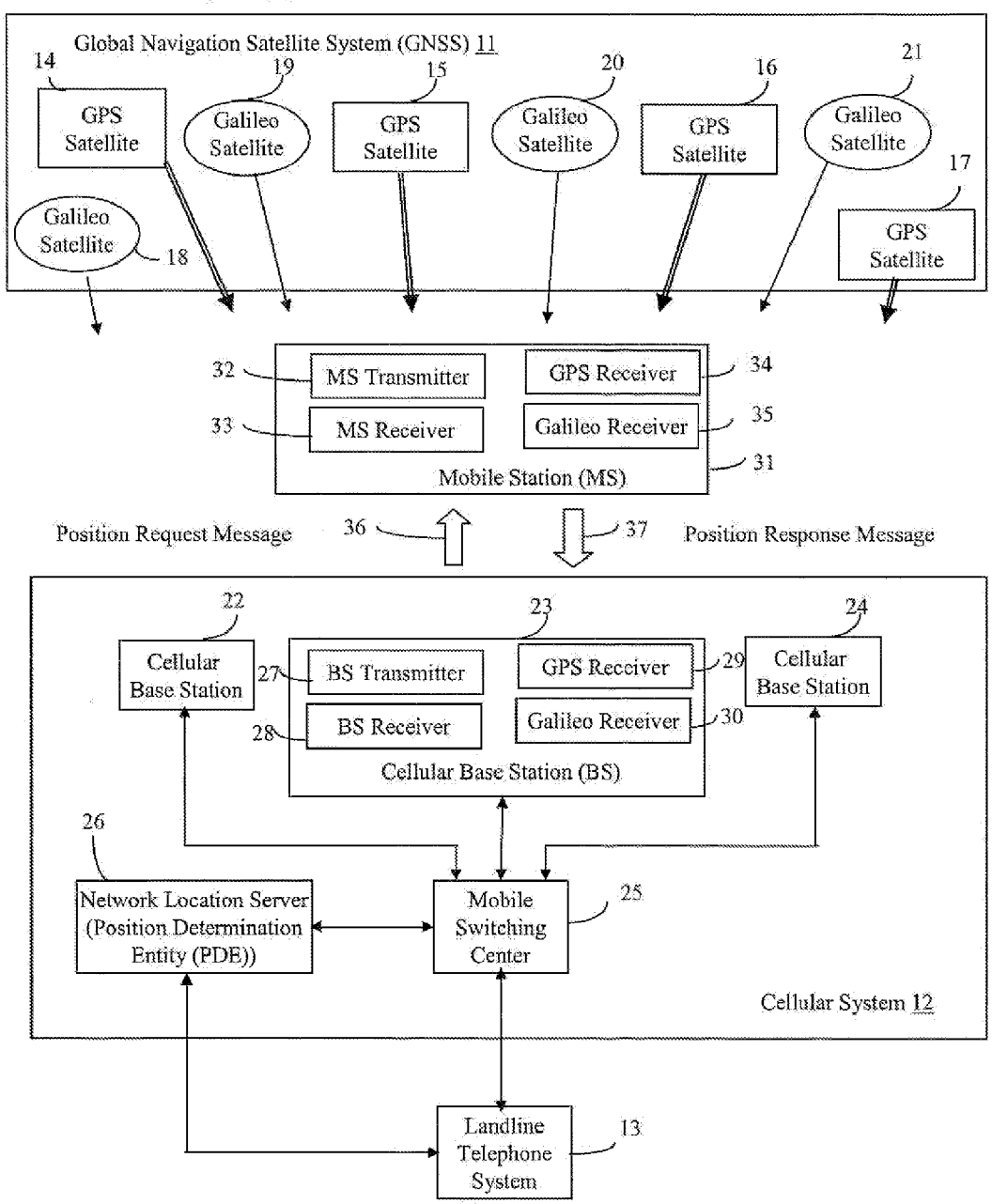

FIG. 2

Table A: Four Options for Modifying a RRLP Position Measure Request and Response Message

| RRLP Measure Position Message | Request Message | Response Message |
|---|---|---|
| Present RRLP Specification | Table 1 | Table 2 |
| Option 1 (New Location Method "Galileo") | Table 3 | Table 4 |
| Option 2 (New Location Method "GNSS") | Table 5 | Table 6 |
| Option 3 (New Location Method "GNSS" Independent from any ICD) | Table 7 | Table 8 |
| Option 4 (Adding Galileo Using Existing GPS Units and Formats) | Table 9 | Table 10 |

Method 38

FIG. 4

Table 1: RRLP Measure Position Request message.

| Elements | Description | Changes required for Galileo |
|---|---|---|
| Measure Position Request | | |
| >Positioning Instructions | | |
| >> Method Type | MS-based, MS-assisted | |
| >> Positioning Methods | E-OTD, GPS, E-OTD or GPS | A new positioning method is needed, e.g., "Galileo" or "GNSS". However, this IE is not extensible. Therefore, the new positioning methods need to be introduced in a separate IE. |
| >> Response Time | Indicates the time available for the MS to perform the measurements. | |
| >> Accuracy | Indicates the desired accuracy of the location estimate. | |
| >> Multiple Sets | Indicates whether more than a single measurement set is allowed/desired (up to three measurement sets can be reported). | |
| >GPS Assistance Data | | Galileo specific assistance data are needed. |
| >> Reference Time | Contains GPS TOW, TOW-GSM time relationship, and time recovery assistance ("TOW Assist"). | Galileo-TOW and Galileo-TOW/GSM time relationship is needed. Could be given directly, or as offset from GPS TOW. Uncertain if/what "TOW Assist" bits are needed. |
| >> Reference Location | 3-D Location with uncertainty | |
| >> DGPS Corrections | Pseudo-range and pseudo-range rate corrections. | Pseudo-range and pseudo-range rate corrections can be used for Galileo. However, TOW, SatID, IODE needs to be specific for Galileo. |
| >> Navigation Model | Ephemeris and Clock Correction parameters, as well as certain bits of the GPS navigation message ("SF1 Reserved", etc.). | Galileo uses basically the same Ephemeris and Clock correction parameters. Some Galileo parameters appear to have a different resolution compared to GPS [3]. Uncertain if/what additional/reserved bits are needed. |
| >> Ionospheric Model | GPS Ionospheric model parameters (alpha, beta). | Galileo may use a different model [3]. |
| >> UTC Model | GPS UTC Model parameters. | Galileo uses basically the same parameters for UTC conversion [3]. |
| >> Almanac | GPS Almanac. | Galileo uses basically the same Almanac parameters [3]. |
| >> Acquisition Assistance | Reference Time Information, predicted code-phase, Doppler and search windows. | Needs to be Galileo specific. |
| >> Real-Time Integrity | Indicates bad satellites. | Can be reused for Galileo. |
| >GPS Time Assistance Measurement Request | Flag to indicate if MS is requested to report GPS-GSM Time relationship. | Galileo Time Assistance Measurement Request is needed. |
| >GPS Reference Time Uncertainty | Gives the uncertainty of the GPS-GSM time relationship. | Galileo Reference Time Uncertainty is needed. |
| >Velocity Request | Flag to indicate if the MS is requested to provide a velocity estimate in addition to a location estimate. | |

FIG. 5

Table 2: RRLP Measure Position Response message.

| Elements | Description | Changes required for Galileo |
|---|---|---|
| Measure Position Response | | |
| >Multiple Sets | Indicates if MS sends 2 or 3 measurement sets (default is one set) | |
| >Location Information | | |
| >> Reference Frame Number | Serving BTS Frame Number | |
| >> GPS TOW | Time Stamp | Galileo TOW time stamp needs to be possible as well. |
| >> Location Estimate | Location estimate with or without uncertainty. | |
| >GPS Measurement Information | | A "Galileo Measurement Information" is needed. |
| >> Frame Number | Serving BTS Frame Number | |
| >> GPS TOW | Time Stamp | Would be Galileo TOW. |
| >> Measurement Parameters | | |
| >>> SV ID | | |
| >>> C/N$_o$ | | |
| >>> Doppler | | |
| >>> Whole Chips | Code phase measurement – whole GPS chips | Code phase measurements in Galileo chips are needed. |
| >>> Fractional Chips | Code phase measurement – fractional chips | |
| >>> Multipath Indicator | | |
| >>> RMS Pseudo-range error | | |
| >Location Information Error | Various error reasons, including request for additional assistance data. | Assistance Data request needs to include Galileo specific assistance data. |
| >GPS Time Assistance Measurements | Contains GPS-GSM time relation measurements. | Galileo Time Assistance Measurements need to be possible as well. |
| >> MSB of Reference Frame | Most significant bits for Frame Number in "Location Information" or "GPS Measurement Information". | |
| >> GPS TOW subms | Sub-millisecond part of the GPS TOW in "Location Information". | Would be Galileo TOW |
| >> Delta TOW | Millisecond difference between the reported GPS TOW in "GPS Measurement Information" and the SV time of the first reported satellite. | Would be Galileo Delta TOW |
| >> GPS Reference Time Uncertainty | Uncertainty of the measured GPS-GSM time relationship. | Would be a Galileo TOW |
| >Velocity Estimate | Velocity estimate with or without uncertainty. | |

FIG. 6

Table 3: RRLP Measure Position Request message for Option 1.

| Elements | Description | Comments |
|---|---|---|
| Measure Position Request | | |
| >Positioning Instructions | | |
| >> Method Type | MS-based, MS-assisted | |
| >> Positioning Methods | E-OTD, GPS, E-OTD or GPS | The Positioning Methods IE is not extensible. Hence, a new Additional Positioning Methods IE needs to be introduced (see below) |
| >> Response Time | Indicates the time available for the MS to perform the measurements. | |
| >> Accuracy | Indicates the desired accuracy of the location estimate. | |
| >> Multiple Sets | Indicates whether more than a single measurement set is allowed/desired (up to three measurement sets can be reported). | |
| >GPS Assistance Data | | Existing A-GPS elements |
| >> Reference Time | Contains GPS TOW, TOW-GSM time relationship, and time recovery assistance ("TOW Assist"). | |
| >> Reference Location | 3-D Location with uncertainty | |
| >> DGPS Corrections | Pseudo-range and pseudo-range rate corrections. | |
| >> Navigation Model | Ephemeris and Clock Correction parameters, as well as certain bits of the GPS navigation message ("SF1 Reserved", etc.). | |
| >> Ionospheric Model | GPS Ionospheric model parameters (alpha, beta). | |
| >> UTC Model | GPS UTC Model parameters. | |
| >> Almanac | GPS Almanac. | |
| >> Acquisition Assistance | Reference Time information, predicted code-phase, Doppler and search windows. | |
| >> Real-Time Integrity | Indicates bad satellites. | |
| >GPS Time Assistance Measurement Request | Flag to indicate if MS is requested to report GPS-GSM Time relationship. | |
| >GPS Reference Time Uncertainty | Gives the uncertainty of the GPS-GSM time relationship. | |
| >Velocity Request | Flag to indicate if the MS is requested to provide a velocity estimate in addition to a location estimate. | |
| >GNSS Positioning Methods | Bit map indicating allowed GNSS methods corresponding to allowance of "GPS" in the existing Positioning Methods IE. For example:<br>- bit 1 : GPS<br>- bit 2 : Galileo<br>- bits 3-n : reserved for future GNSS methods | Since the "Positioning Methods" IE is not extensible, the new positioning methods need to be introduced in a separate IE. |

Table 3: RRLP Measure Position Request message for Option 1.
(Continued)

| | | |
|---|---|---|
| > Galileo Assistance Data | | "Reference location" would not need to be defined here. I.e. the corresponding IE in "GPS Assistance Data" would be sufficient, but could be added here as well to have a single Assistance Data IE for Galileo only receivers. |
| >> Galileo Reference Time | Contains Galileo TOW, TOW-GSM time relationship, and possibly time recovery assistance ("TOW Assist") | "TOW Assist" is TBD, since no final Galileo ICD is available. Either GPS Reference Time or Galileo Reference Time may be provided by the SMLC for a combined GPS/Galileo receiver. |
| >> Reference Location | 3-D Location with uncertainty | |
| >> Galileo Differential Corrections | Pseudo-range and pseudo-range rate corrections for Galileo SV's | |
| >> Galileo Navigation Model | Ephemeris and Clock Correction parameters for Galileo constellation, and possibly additional reserved bits. | Additional reserved bits are TBD, since no final Galileo ICD is available. |
| >> Galileo Ionosphere Model | Galileo Ionospheric Model Parameters | Receivers may either use GPS or Galileo Ionospheric model, or both. |
| >> Galileo UTC Model | Galileo UTC Model parameters | |
| >> Galileo Almanac | Galileo Almanac Parameters | |
| >> Galileo Acquisition Assistance | Galileo Reference Time Information, predicted code-phase and Doppler. | |
| >> Galileo Real-Time Integrity | Indicates bad Galileo Satellites | |
| >> GPS-Galileo Time Offset (GGTO) | Parameters for Galileo to GPS time conversion | |
| >Galileo Time Assistance Measurement Request | Flag to indicate if MS is requested to report Galileo-GSM Time relationship. | If "GPS Time Assistance Measurement Request" and "Galileo Time Assistance Measurement Request" are both present, the MS may choose which Time Assistance Measurements to provide (i.e. GPS or Galileo). As an alternative, the "Additional Positioning Methods" and "Galileo Time Assistance Measurement Request" IEs may be combined into a single "Additional Positioning Instructions" IE. |
| >Galileo Reference Time Uncertainty | Gives the uncertainty of the Galileo-GSM time relationship. | As an alternative, this IE may be directly included in the "Galileo Reference Time" and "Galileo Acquisition Assistance". |

Table 4: RRLP Measure Position Response message for Option 1.

| Elements | Description | Comments |
|---|---|---|
| Measure Position Response | | |
| >Multiple Sets | Indicates if MS sends 2 or 3 measurement sets (default is one set) | |
| >Location Information | | |
| >> Reference Frame Number | Serving BTS Frame Number | |
| >> GPS TOW | Time Stamp | |
| >> Location Estimate | Location estimate with or without uncertainty | |
| >GPS Measurement Information | | |
| >> Frame Number | Serving BTS Frame Number | |
| >> GPS TOW | Time Stamp | |
| >> Measurement Parameters | | |
| >>> SV ID | | |
| >>> C/N$_0$ | | |
| >>> Doppler | | |
| >>> Whole Chips | Code phase measurement – whole GPS chips | |
| >>> Fractional Chips | Code phase measurement – fractional chips | |
| >>> Multipath Indicator | | |
| >>> RMS Pseudo-range error | | |
| >Location Information Error | Various error reasons, including request for additional assistance data. | |
| >GPS Time Assistance Measurements | Contains GPS-GSM time relation measurements. | |
| >> MSB of Reference Frame | Most significant bits for Frame Number in "Location Information" or "GPS Measurement Information". | |
| >> GPS TOW subms | Sub-millisecond part of the GPS TOW in "Location Information". | |
| >> Delta TOW | Millisecond difference between the reported GPS TOW in "GPS Measurement Information" and the SV time of the first reported satellite. | |
| >> GPS Reference Time Uncertainty | Uncertainty of the measured GPS-GSM time relationship. | |
| >Velocity Estimate | Velocity estimate with or without uncertainty. | |
| >Additional Location Information | | Since existing "Location Information" IE is time stamped with GPS TOW, a new "Additional Location Information" IE may be needed. Either "Location Information" or "Additional |

Table 4: RRLP Measure Position Response message for Option 1.
(Continued)

| | | |
|---|---|---|
| >> Reference Frame Number | Serving BTS Frame Number | Location Information" would be present in a response message, but never both. |
| >> Galileo TOW | Time Stamp | |
| >> Location Estimate | Location estimate with or without uncertainty | |
| >Galileo Measurement Information | | Both, "GPS Measurement Information" and "Galileo Measurement Information" may be present. |
| >> Frame Number | Serving BTS Frame Number | For combined GPS/Galileo receivers, this IE may not be needed (i.e., would be the same as in "GPS Measurement Information"), but needs to be included for Galileo only receiver or Galileo only measurements. |
| >> Galileo TOW | Time Stamp | As an alternative, GPS TOW can be used for time tagging the Galileo code-phase measurements for combined receivers. In that case, this IE would not be needed. |
| >> Measurement Parameters | | If "GPS Measurement Information" is reported as well, only this group of IEs may be needed for the "Galileo Measurement Information". |
| >>> SV ID | Galileo Satellite ID | |
| >>> C/N$_o$ | | |
| >>> Doppler | | |
| >>> Whole Chips | Code phase measurement – whole Galileo chips | |
| >>> Fractional Chips | Code phase measurement – fractional Galileo chips | |
| >>> Multipath Indicator | | |
| >>> RMS Pseudo-range error | | |
| >Additional Location Information Error | Additional Galileo specific error codes, e.g., Galileo Assistance Data Request | |
| >Galileo Time Assistance Measurements | Contains Galileo-GSM time relation | Could be directly included in "Galileo Measurement Information" and "Additional Location Information". |
| >> MSB of Reference Frame | Most significant bits for Frame Number in "Additional Location Information" or "Galileo Measurement Information" | |
| >> Galileo TOW subms | Sub-millisecond part of the Galileo TOW in "Additional Location Information" | |
| >> Delta TOW | Difference between the reported Galileo TOW in "Galileo Measurement Information" and the SV time of the first reported satellite | |
| >> Galileo Reference Time Uncertainty | Uncertainty of the measured Galileo-GSM time relationship. | |

FIG. 10

Table 5: RRLP Measure Position Request message for Option 2.

| Elements | Description | Comments |
|---|---|---|
| Measure Position Request | | |
| >Positioning Instructions | | |
| >> Method Type | MS-based, MS-assisted | |
| >> Positioning Methods | E-OTD, GPS, E-OTD or GPS | The Positioning Methods IE is not extensible. Hence, a new Additional Positioning Methods IE needs to be introduced (see below) |
| >> Response Time | Indicates the time available for the MS to perform the measurements. | |
| >> Accuracy | Indicates the desired accuracy of the location estimate. | |
| >> Multiple Sets | Indicates whether more than a single measurement set is allowed/desired (up to three measurement sets can be reported). | |
| >GPS Assistance Data | | Existing A-GPS elements |
| >> Reference Time | Contains GPS TOW, TOW-GSM time relationship, and time recovery assistance ("TOW Assist"). | |
| >> Reference Location | 3-D Location with uncertainty | |
| >> DGPS Corrections | Pseudo-range and pseudo-range rate corrections. | |
| >> Navigation Model | Ephemeris and Clock Correction parameters, as well as certain bits of the GPS navigation message ("SF1 Reserved", etc.). | |
| >> Ionospheric Model | GPS Ionospheric model parameters (alpha, beta). | |
| >> UTC Model | GPS UTC Model parameters | |
| >> Almanac | GPS Almanac | |
| >> Acquisition Assistance | Reference Time Information, predicted code-phase, Doppler and search windows. | |
| >> Real-Time Integrity | Indicates bad satellites | |
| >GPS Time Assistance Measurement Request | Flag to indicate if MS is requested to report GPS-GSM Time relationship. | |
| >GPS Reference Time Uncertainty | Gives the uncertainty of the GPS-GSM time relationship. | |
| >Velocity Request | Flag to indicate if the MS is requested to provide a velocity estimate in addition to a location estimate. | |
| >Additional Positioning Methods | GNSS, E-OTD or GNSS | Since the "Positioning Methods" IE is not extensible, the new positioning methods need to be introduced in a separate IE. It may still be desirable to distinguish different GNSS systems [5]. In that case, the bit map as shown in Option 1 (Table 3) could be included here as well. |

Table 5: RRLP Measure Position Request message for Option 2.

(Continued)

| | | |
|---|---|---|
| > GNSS Assistance Data | | |
| >> Reference Location | 3-D Location with uncertainty | The only assistance data element which is independent of any constellation. |
| >> for each constellation: | GPS and/or Galileo | |
| >>> Constellation ID | Identifies the constellation for which the following assistance data are given | |
| >>> GNSS Reference Time | GPS or Galileo Reference Time | |
| >>> GNSS Differential Corrections | GPS or Galileo Differential Corrections | |
| >>> GNSS Navigation Model | GPS or Galileo Navigation Model. | |
| >>> GNSS Ionospheric Model | GPS or Galileo Ionospheric Model | |
| >>> GNSS UTC Model | GPS or Galileo UTC Model | |
| >>> GNSS Almanac | GPS or Galileo Almanac | |
| >>> GNSS Acquisition Assistance | GPS or Galileo Acquisistion Assistance | |
| >>> GNSS Real Time Integrity | GPS or Galileo Real Time Integrity | |
| > GNSS Time Assistance Measurement Request | Flag to indicate if MS is requested to report Galileo/GPS-GSM Time relationship | May be combined with the "Additional Positioning Methods" into an "Additional Positioning Instructions" IE. |
| >> Constellation ID | Indicates whether GPS or Galileo time assistance measurements are requested. | May not be needed. I.e., the MS could choose the time frame. |
| > GNSS Reference Time Uncertainty | Gives the uncertainty of the GPS-GSM or Galileo-GSM time relationship. | Could also directly be included in the "GNSS Assistance Data" (Reference Time and Acquisition Assistance). |
| >> Constellation ID | Identifies the constellation for which the Reference Time Uncertainty is given. | |

Table 6: RRLP Measure Position Response message for Option 2.

| Elements | Description | Comments |
|---|---|---|
| Measure Position Response | | |
| >Multiple Sets | Indicates if MS sends 2 or 3 measurement sets (default is one set). | |
| >Location Information | | |
| >> Reference Frame Number | Serving BTS Frame Number | |
| >> GPS TOW | Time Stamp | |
| >> Location Estimate | Location estimate with or without uncertainty | |
| >GPS Measurement Information | | |
| >> Frame Number | Serving BTS Frame Number | |
| >> GPS TOW | Time Stamp | |
| >> Measurement Parameters | | |
| >>> SV ID | | |
| >>> C/N$_0$ | | |
| >>> Doppler | | |
| >>> Whole Chips | Code phase measurement – whole GPS chips | |
| >>> Fractional Chips | Code phase measurement – fractional chips | |
| >>> Multipath Indicator | | |
| >>> RMS Pseudo-range error | | |
| >Location Information Error | Various error reasons, including request for additional assistance data. | |
| >GPS Time Assistance Measurements | Contains GPS-GSM time relation measurements. | |
| >> MSB of Reference Frame | Most significant bits for Frame Number in "Location Information" or "GPS Measurement Information". | |
| >> GPS TOW subms | Sub-millisecond part of the GPS TOW in "Location Information". | |
| >> Delta TOW | Millisecond difference between the reported GPS TOW in "GPS Measurement Information" and the SV time of the first reported satellite. | |
| >> GPS Reference Time Uncertainty | Uncertainty of the measured GPS-GSM time relationship. | |
| >Velocity Estimate | Velocity estimate with or without uncertainty. | |
| >GNSS Location Information | | Combines Location Estimate and time assistance measurements. Could also be introduced in separate information elements as in current A-GPS standard, if desired. |

60 { (bracket encompassing GNSS Location Information row)

FIG. 13

Table 6: RRLP Measure Position Response message for Option 2.

(Continued)

| | | |
|---|---|---|
| >> Reference Frame Number | Serving BTS Frame Number | |
| >> MSB of Reference Frame Number | | |
| >> Constellation ID | Identifies the constellation for which the time assistance measurements/location time stamp are given. | |
| >>> TOW | Time Stamp according to constellation ID | "TOW" and "TOW subms" may be combined into a single IE. |
| >>> TOW subms | | |
| >>> Reference Time Uncertainty | | Uncertainty of the time assistance measurement. |
| Information | Location estimate with or without uncertainty | Combines Measurement Information and time assistance measurements. Could also be introduced in separate information elements as in current A-GPS standard, if desired. |
| >> Frame Number | Serving BTS Frame Number | |
| >> MSB of Frame Number | | |
| >> for each constellation | | |
| >>> Constellation ID | Defines the constellation | |
| >>> TOW | Time Stamp | |
| >>> Delta TOW | | |
| >>> Reference Time Uncertainty | | Uncertainty of the time assistance measurement. |
| >>> Measurement Parameters | | |
| >>>> SV ID | | |
| >>>> C/N$_0$ | | |
| >>>> Doppler | | |
| >>>> Whole Chips | Code phase measurement – whole chips | |
| >>>> Fractional Chips | Code phase measurement – fractional chips | |
| >>>> Multipath Indicator | | |
| >>>> RMS Pseudo-range error | | |
| >GNSS Location Information Error | Various error reasons and GNSS assistance data request | |

Table 7: RRLP Measure Position Request message for Option 3.

| Elements | Description | Comments |
|---|---|---|
| Measure Position Request | | |
| >Positioning Instructions | | |
| >> Method Type | MS-based, MS-assisted | |
| >> Positioning Methods | E-OTD, GPS, E-OTD or GPS | The Positioning Methods IE is not extensible. Hence, a new Additional Positioning Methods IE needs to be introduced (see below) |
| >> Response Time | Indicates the time available for the MS to perform the measurements | |
| >> Ionospheric Model | GPS Ionospheric model parameters (alpha, beta). | |
| >> UTC Model | GPS UTC Model parameters | |
| >> Almanac | GPS Almanac | |
| >> Acquisition Assistance | Reference Time Information, predicted code-phase, Doppler and search windows. | |
| >> Real-Time Integrity | Indicates bad satellites | |
| >GPS Time Assistance Measurement Request | Flag to indicate if MS is requested to report GPS-GSM Time relationship. | |
| >GPS Reference Time Uncertainty | Gives the uncertainty of the GPS-GSM time relationship. | |
| >Velocity Request | Flag to indicate if the MS is requested to provide a velocity estimate in addition to a location estimate. | |
| >Additional Positioning Methods | GNSS, E-OTD or GNSS | Since the "Positioning Methods" IE is not extensible, the new positioning methods need to be introduced in a separate IE. It may still be desirable to distinguish different GNSS systems [5]. In that case, the bit map as shown in Option 1 (Table 3) could be included here as well. |
| > GNSS Assistance Data | | Different constellations still need to be distinguished – e.g., using GNSS SV IDs – to enable the receiver to perform the measurements. |
| >> Reference Location | 3-D Location with uncertainty | |
| >> Reference Time | e.g., UTC; GSM-UTC time relationship | |
| >> Differential Corrections | Generic | |
| >> Navigation Model | Any MEO orbit model. | |
| >> Ionospheric Model | Any ionospheric model | |
| >> UTC Model | Parameters to transfer UTC to GPS/Galileo clock | |
| >> Almanac | Any MEO orbit model | |
| >> Acquisition Assistance | Encoded in physical units, e.g., Hz, meters, seconds | |
| >> Real Time Integrity | | |
| > GNSS Time Assistance Measurement Request | Flag to indicate if MS is requested to report UTC-GSM Time relationship. | May be combined with the "Additional Positioning Methods" into an "Additional Positioning Instructions" IE. |

Table 8: RRLP Measure Position Response message for Option 3.

| Elements | Description | Comments |
|---|---|---|
| Measure Position Response | | |
| >Multiple Sets | Indicates if MS sends 2 or 3 measurement sets (default is one set). | |
| >Location Information | | |
| >> Reference Frame Number | Serving BTS Frame Number | |
| >> GPS TOW | Time Stamp | |
| >> Location Estimate | Location estimate with or without uncertainty | |
| >GPS Measurement Information | | |
| >> Frame Number | Serving BTS Frame Number | |
| >> GPS TOW | Time Stamp | |
| >> Measurement Parameters | | |
| >>> SV ID | | |
| >>> C/N$_o$ | | |
| >>> Doppler | | |
| >>> Whole Chips | Code phase measurement – whole GPS chips | |
| >>> Fractional Chips | Code phase measurement – fractional chips | |
| >>> Multipath Indicator | | |
| >>> RMS Pseudo-range error | | |
| >Location Information Error | Various error reasons, including request for additional assistance data. | |

FIG. 16

Table 8: RRLP Measure Position Response message for Option 3.

(Continued)

| | | |
|---|---|---|
| >GPS Time Assistance Measurements | Contains GPS-GSM time relation measurements. | |
| >> MSB of Reference Frame | Most significant bits for Frame Number in "Location Information" or "GPS Measurement Information". | |
| >> GPS TOW subms | Sub-millisecond part of the GPS TOW in "Location Information". | |
| >> Delta TOW | Millisecond difference between the reported GPS TOW in "GPS Measurement Information" and the SV time of the first reported satellite. | |
| >> GPS Reference Time Uncertainty | Uncertainty of the measured GPS-GSM time relationship. | |
| >Velocity Estimate | Velocity estimate with or without uncertainty | |
| >GNSS Location Information | | Combines Location Estimate and time assistance measurements. Could also be introduced in separate information elements as in current A-GPS standard, if desired. |
| >> Reference Frame Number | Serving BTS Frame Number | |
| >> UTC | Generic Time Stamp | |
| >> Reference Time Uncertainty | Uncertainty of the measured UTC-GSM time relationship | |
| >> Location Estimate | Location estimate with or without uncertainty | |
| >GNSS Measurement Information | | Combines Measurement Information and time assistance measurements. Could also be introduced in separate information. |
| >> UTC | Time Stamp | |
| >> Reference Time Uncertainty | Uncertainty of the measured UTC-GSM time relationship | |
| >> Measurement Parameters | | |
| >>> SV ID | | Galileo and GPS satellites could have 3GPP defined SV IDs. |
| >>> C/N$_0$ | | |
| >>> Doppler | | |
| >>> Pseudo-range | E.g., in meters | |
| >>> Multipath Indicator | | |
| >>> RMS Pseudo-range error | | |
| >GNSS Location Information Error | Various error reasons and GNSS assistance data request. | |

Table 9: RRLP Measure Position Request message for Option 4.

| Elements | Description | Comments |
|---|---|---|
| Measure Position Request | | |
| >Positioning Instructions | | |
| >> Method Type | MS-based, MS-assisted | |
| >> Positioning Methods | E-OTD, GPS, E-OTD or GPS | The Positioning Methods IE is not extensible. Hence, a new Additional Positioning Methods IE needs to be introduced (see below) |
| >> Response Time | Indicates the time available for the MS to perform the measurements. | |
| >> Accuracy | Indicates the desired accuracy of the location estimate. | |
| >> Multiple Sets | Indicates whether more than a single measurement set is allowed/desired (up to three measurement sets can be reported). | |
| >GPS Assistance Data | | Existing A-GPS elements |
| >> Reference Time | Contains GPS TOW, TOW-GSM time relationship, and time recovery assistance ("TOW Assist"). | |
| >> Reference Location | 3-D Location with uncertainty | |
| >> DGPS Corrections | Pseudo-range and pseudo-range rate corrections | For GPS SVIDs 1–64 |
| >> Navigation Model | Ephemeris and Clock Correction parameters, as well as certain bits of the GPS navigation message ("SF1 Reserved", etc.). | For GPS SVIDs 1–64 |
| >> Ionospheric Model | GPS Ionospheric model parameters (alpha, beta). | |
| >> UTC Model | GPS UTC Model parameters | |
| >> Almanac | GPS Almanac | For GPS SVIDs 1–64 |
| >> Acquisition Assistance | Reference Time Information, predicted code-phase and Doppler. | For GPS SVIDs 1–64 |
| >> Real-Time Integrity | Indicates bad satellites | For GPS SVIDs 1–64 |
| >GPS Time Assistance Measurement Request | Flag to indicate if MS is requested to report GPS-GSM Time relationship. | |

FIG. 18

Table 9: RRLP Measure Position Request message for Option 4.

(Continued)

| | | |
|---|---|---|
| >GPS Reference Time Uncertainty | Gives the uncertainty of the GPS-GSM time relationship. | |
| >Velocity Request | Flag to indicate if the MS is requested to provide a velocity estimate in addition to a location estimate. | |
| >Additional Positioning Methods | Bit map indicating allowed GNSS methods corresponding to allowance of "GPS" in the existing Positioning Methods IE. For example:<br>- bit 1 : GPS<br>- bit 2 : Galileo<br>bits 3-n : reserved for future GNSS methods. | Since the "Positioning Methods" IE is not extensible, the new positioning methods need to be introduced in a separate IE. |
| > Additional Assistance Data | | |
| >> Additional Differential Corrections | Pseudo-range and pseudo-range rate corrections for additional SV-IDs | For Galileo SVIDs. Encoded exactly in the same way as "DGPS Corrections", i.e., GPS TOW is used for reference time, etc. |
| >>Additional Navigation Model | Ephemeris and Clock Correction parameters for additional SV-IDs | For Galileo SVIDs. Encoded exactly in the same way as "GPS Navigation Model". Clock corrections could either be constellation time (Galileo) specific together with GGTO (Option 4b), or GPS time specific where GGTO is applied at SMLC (Option 4a). |
| >> Additional Almanac | Additional Almanac Parameters | For Galileo SVIDs. Encoded exactly in the same way as "GPS Almanac". |
| >> Additional Acquisition Assistance | Reference Time Information, predicted code-phase and Doppler. | For Galileo SVIDs. Encoded exactly in the same way as "GPS Acquisition Assistance" (e.g., ranges expressed in GPS CA-code phase; Integer Code-phase, bit number, etc.). |
| >> Additional Real-Time Integrity | Indicates bad Satellites for additional SV-IDs | For Galileo SVIDs. |
| >> GPS-Galileo Time Offset (GGTO) | Parameters for Galileo to GPS time conversion | Only needed if Galileo time is not converted to GPS time at SMLC (i.e., only for Option 4b). |

FIG. 19

Table 10: RRLP Measure Position Response message for Option 4.

| Elements | Description | Comments |
|---|---|---|
| Measure Position Response | | |
| >Multiple Sets | Indicates if MS sends 2 or 3 measurement sets (default is one set) | |
| >Location Information | | No need to define an "Additional/GNSS Location Information" as in Options 1–3. |
| >> Reference Frame Number | Serving BTS Frame Number | |
| >> GPS TOW | Time Stamp | |
| >> Location Estimate | Location estimate with or without uncertainty | |
| >GPS Measurement Information | | |
| >> Frame Number | Serving BTS Frame Number | |
| >> GPS TOW | Time Stamp | |
| >> Measurement Parameters | | |
| >>> SV ID | | For GPS SVIDs 1–64 |
| >>> C/N$_0$ | | |
| >>> Doppler | | |
| >>> Whole Chips | Code phase measurement – whole GPS chips | |
| >>> Fractional Chips | Code phase measurement – fractional chips | |
| >>> Multipath Indicator | | |
| >>> RMS Pseudo-range error | | |
| >Location Information Error | Various error reasons, including request for additional assistance data. | |
| >GPS Time Assistance Measurements | Contains GPS-GSM time relation measurements. | |
| >> MSB of Reference Frame | Most significant bits for Frame Number in "Location Information" or "GPS Measurement Information". | |
| >> GPS TOW subms | Sub-millisecond part of the GPS TOW in "Location Information". | |
| >> Delta TOW | Millisecond difference between the reported GPS TOW in "GPS Measurement Information" and | |

Table 10: RRLP Measure Position Response message for Option 4.

(Continued)

| | | the SV time of the first reported satellite. | |
|---|---|---|---|
| | >> GPS Reference Time Uncertainty | Uncertainty of the measured GPS-GSM time relationship. | |
| | >Velocity Estimate | Velocity estimate with or without uncertainty | |
| 60 | >Additional Measurement Information | | For additional SV IDs. |
| | >> Frame Number | Serving BTS Frame Number | Would only be included if no measurements are reported for GPS SVIDs 1-64. |
| | >> GPS TOW | Time Stamp | Would only be included if no measurements are reported for GPS SVIDs 1-64. |
| | >> Measurement Parameters | | |
| | >>> Additional SV ID | | E.g., for Galileo SVIDs |
| | >>> C/N$_0$ | | |
| | >>> Doppler | | |
| | >>> Whole Chips | C/A-code chips | Any constellation specific code phase measurements are converted to C/A code GPS chips. |
| | >>> Fractional Chips | C/A-code chips | |
| | >>> Multipath Indicator | | |
| | >>> RMS Pseudo-range error | | |

FIG. 20

GLOBAL NAVIGATION SATELLITE SYSTEM

CROSS-REFERENCE TO RELATED APPLICATIONS

The present application claims priority to U.S. Provisional Application No. 60/782,955, filed on Mar. 15, 2006 entitled, "Virtual GNSS Time," which is assigned to the assignee hereof and which is incorporated herein by reference. The present application is a continuation-in-part of U.S. application Ser. No. 11/621,935, filed on Jan. 10, 2007, entitled "Global Navigation Satellite System", which is assigned to the assignee hereof and which is incorporated herein by reference.

FIELD OF THE INVENTION

The present invention generally relates to communication systems. More particularly, the present invention relates to a communication system including a global navigation satellite system.

BACKGROUND OF THE INVENTION

There are many different types of technologies employed in calculating the location of mobile stations in wireless networks with various levels of success and accuracy. Assisted-GPS (A-GPS) is a positioning technology that is presently used for locating mobile stations in wireless networks. An A-GPS server provides assistance data to the mobile station in order for it to have a low Time to First Fix (TTFF), to permit weak signal acquisition, and to optimize mobile station battery use. A-GPS is used as a location technology in isolation or hybridized with other positioning technologies that provide range-like measurements.

An A-GPS server provides data to a wireless mobile station that is specific to the approximate location of a mobile station. The assistance data helps the mobile station lock onto satellites quickly, and potentially allows the handset to lock onto weak signals. The mobile station then performs the position calculation or optionally returns the measured code phases and potentially carrier phases to the server to do the calculation. The A-GPS server can make use of additional information such as round-trip timing measurements from a cellular base station to the mobile station in order to calculate a location where it may otherwise not be possible, for example when there are not enough GPS satellites visible.

Advances in satellite-based global positioning system (GPS), timing advance (TA), and terrestrial-based enhanced observed time difference (E-OTD) position fixing technology enable a precise determination of the geographic position (e.g., latitude and longitude) of a mobile station subscriber. As geographic location services are deployed within wireless communications networks, such positional information may be stored in network elements and delivered to nodes in the network using signaling messages. Such information may be stored in SMLCs (Serving Mobile Location Centers), SASs (Stand-Alone SMLCs), PDEs (Position Determining Entities), SLPs (Secure User Plane Location Platforms) and special purpose mobile subscriber location databases.

One example of a special purpose mobile subscriber location database is the SMLC proposed by the 3rd Generation Partnership Project (3GPP). In particular, 3GPP has defined a signaling protocol for communicating mobile subscriber positional information to and from an SMLC. This signaling protocol is referred to as the Radio Resource LCS (Location Services) protocol, denoted RRLP, and defines signaling messages communicated between a mobile station and an SMLC related to a mobile subscriber's location. A detailed description of the RRLP protocol is found in 3GPP TS 44.031 v7.2.0 (2005-11) $3^{rd}$ Generation Partnership Project; Technical Specification Group GSM Edge Radio Access Network; Location Services (LCS); Mobile Station (MS)—Serving Mobile Location Center (SMLC) Radio Resource LCS Protocol (RRLP) (Release 7).

In addition to the United States Global Positioning System (GPS), other Satellite Positioning Systems (SPS), such as the Russian GLONASS system or the proposed European Galileo System, or the proposed Chinese Compass/Beidou System may also be used for position location of a mobile station. However, each of the systems operates according to different specifications. In particular, each of the systems uses its own specific system time.

With the launch of Galileo, the number of visible navigation satellites is basically doubled at a combined GPS/Galileo receiver, or trebled at a combined GPS/GLONASS/Galileo receiver, which in general improves service availability and accuracy. The additional satellites provide redundancy and can be used to e.g., eliminate poor quality measurements while maintaining sufficient Geometric Dilution of Precision (GDOP). In certain critical navigation scenarios, an e.g., combined GPS/Galileo receiver may be able to obtain a position fix where either GPS or Galileo alone does not provide enough satellite measurements to obtain a successful navigation solution.

GPS (Global Positioning System) and Galileo are independent navigation systems and therefore, each system uses its own navigation time reference. GPS System Time is steered to universal temps coordine' (UTC) (universal coordinated time) as maintained by the US Naval Observatory, referred to as UTC (USNO). GPS System Time is specified to be kept within 1 microsecond modulo 1 second of UTC (USNO).

Galileo System Time is expected to be steered to International Atomic Time (TAI) and is specified to be kept within 50 ns of TAI. Apart form a potential integer number of seconds, the offset between GPS and Galileo System Time is expected to be in the order of tens of nanoseconds.

The offset between GPS and Galileo System time will be included in the Galileo broadcast navigation message as well as in the future GPS broadcast navigation message, and is referred to as GPS-Galileo Time Offset, or more generally, to GPS-GNSS Time Offset (GGTO). For GPS, the GGTO is already specified in Message Type 35 of the December 2004 version of IS-GPS-200, Revision D, which may include the GPS-Galileo GGTO as well as the GPS-GLONASS GGTO.

For example, a combined GPS/Galileo receiver that uses GPS and Galileo pseudo-range measurements in the navigation solution can perform according to the three following options.

1. Ignore the GPS-Galileo time offset in the position calculation.
2. Use an additional satellite signal measurement to obtain the GGTO as part of the navigation solution.
3. Use the GGTO either available from decoding the navigation message or via assistance data provided by the cellular network.

The first option would likely result in a biased navigation solution. The amount of bias depends on the actual GGTO, and may be acceptable in certain scenarios, but of course, is less desirable.

The second option would require at least one additional satellite measurement in the navigation solution, which may not always be available in certain critical scenarios (e.g., indoors or urban canyons). At least five satellite measurements would be required to solve for three-dimensional position, receiver time bias, and GGTO, but more than five would be desirable to improve accuracy.

The third option does not require an additional satellite measurement and is the preferred approach in environments with limited satellite visibility (e.g., indoors or urban canyons). The GGTO may be obtained by decoding the satellite navigation message (which however, requires sufficient satellite signal strength and takes a relative long time; i.e., increases the TTFF), or may be provided in the assistance data message (which however, requires modifications to standardized location protocols). The user receiver has to take the GGTO into account when combining pseudo-ranges for GPS and Galileo satellites. Either the GPS or Galileo observations have to be corrected for the GGTO before applying the navigation solution.

However, handling the various different system times and time offsets in the navigation solution requires substantial modifications to existing user receivers, and would undoubtedly raise the costs associated with production of next generation user receivers having this capability.

Accordingly, there is a need for a communication system, including a global navigation satellite system (GNSS), which can determine a position location for a mobile station based on satellite signals sent from two or more satellite systems, rather than just one satellite system, to provide further efficiencies and advantages for position location without the need for handling various GNSS system times at the mobile receiver and without specifying a completely new location protocol for assistance and mobile measurement data transfer.

Moreover, there is a need in the art for a communications system, method and/or apparatus that is adapted to calculate and correct for the GGTO without adding significant upgrade or production costs to existing and future user receivers.

SUMMARY OF THE INVENTION

The present invention includes a method, an apparatus, and/or a system. The apparatus may include data processing systems, which perform the method, and computer readable media storing executable applications which, when executed on the data processing systems, cause the data processing systems to perform the method.

According to one aspect of the present invention, each of a first and a second global navigation satellite system (GNSS) are adapted to operate according to a first and a second specification, respectively, and each includes a first and a second plurality of space vehicles (SV), respectively. Each of the first and the second plurality of SVs are adapted to be identified by a first and a second plurality of unique corresponding identifications (IDs), respectively. A processor is adapted to receive and identify a first plurality of corresponding signals transmitted from the first plurality of SVs in response to the first plurality of unique corresponding IDs. The processor is adapted to receive and identify a second plurality of corresponding signals transmitted from the second plurality of SVs in response to the second plurality of unique corresponding IDs. The processor is adapted to determine position location information in response to receiving and identifying the first plurality of corresponding signals and the second plurality of corresponding signals.

According to other aspects of the present invention, the present invention employs an apparatus, a method, a computer readable memory, and a signal protocol.

These and other aspects of the present invention will be apparent from the accompanying drawings and from the following detailed description.

BRIEF DESCRIPTION OF THE DRAWINGS

Aspects of the present invention are illustrated by way of examples and not limitation in the figures of the accompanying drawings, in which like reference numbers designate corresponding elements.

FIG. 1 illustrates a block diagram representation of a communication system, including a global navigation satellite system (GNSS), a cellular system, and a mobile station, according to one aspect of the present invention.

FIG. 2 illustrates Table A representing four options for modifying a radio resource location services protocol (RRLP) position measure request message and a RRLP position measure response message for a present RRLP specification, according to one aspect of the present invention.

FIG. 4 illustrates Table 1 representing the RRLP position measure request message for the present RRLP specification, according to one aspect of the present invention.

FIG. 5 illustrates Table 2 representing the RRLP position measure response message for a present RRLP specification, according to one aspect of the present invention.

FIGS. 6 and 7 illustrate Table 3 representing a modified RRLP position measure request message in accordance with option one, according to one aspect of the present invention.

FIGS. 8 and 9 illustrate Table 4 representing a modified RRLP position measure response message in accordance with option one, according to one aspect of the present invention.

FIGS. 10 and 11 illustrate Table 5 representing a modified RRLP position measure request message in accordance with option two, according to one aspect of the present invention.

FIGS. 12 and 13 illustrate Table 6 representing a RRLP position measure response message in accordance with option two, according to one aspect of the present invention.

FIG. 14 illustrates Table 7 representing a modified RRLP position measure request message in accordance with option three, according to one aspect of the present invention.

FIGS. 15 and 16 illustrate Table 8 representing a RRLP position measure response message in accordance with option three, according to one aspect of the present invention.

FIGS. 17 and 18 illustrate Table 9 representing a RRLP position measure request message in accordance with option four, according to one aspect of the present invention.

FIGS. 19 and 20 illustrate Table 10 representing a RRLP position measure response message in accordance with option four, according to one aspect of the present invention.

DETAILED DESCRIPTION OF THE EMBODIMENTS

Figure 3:
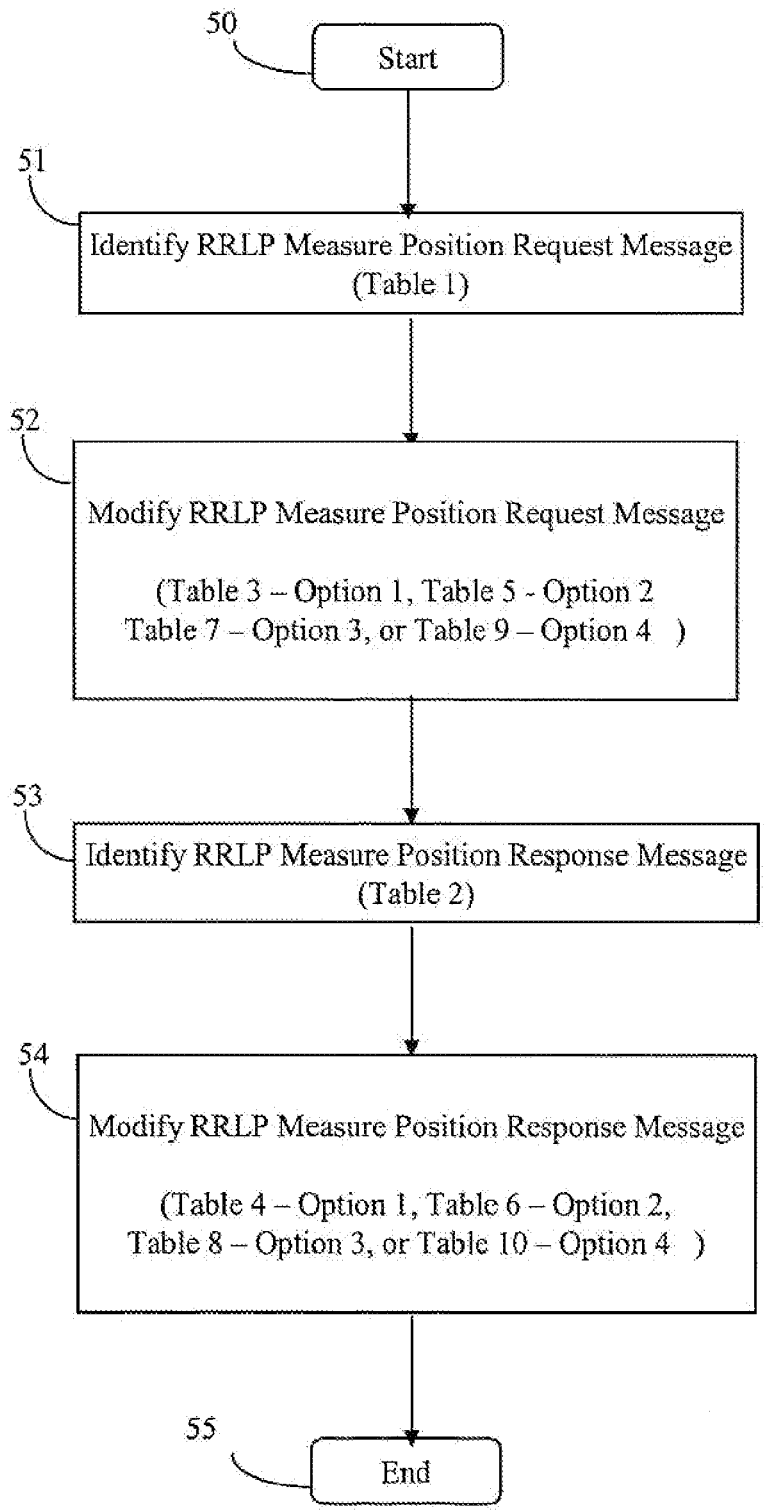
FIG. 3 illustrates a method for modifying the present RRLP position measure request message and present RRLP position measure response message in accordance with one of the four options, according to one aspect of the present invention.

The following description and drawings are illustrative of the invention and are not to be construed as limiting the invention. Numerous specific details are described to provide a thorough understanding of the present invention. However, in certain instances, well-known or conventional details are not described in order to avoid obscuring the description of the present invention. References to one embodiment or an embodiment in the present disclosure are not necessarily to the same embodiment, and such references include one or more embodiments.

Communication System 10

FIG. 1 illustrates a block diagram representation of a communication system 10, including a global navigation satellite system (GNSS) 11, a cellular system 12, a landline telephone system 13, according to one aspect of the present invention. The GNSS system 11 includes multiple global navigation satellites 14-21, including a first set of satellites 14-17 associated with a first GNSS and a second set of satellites 18-21 associated with a second GNSS. The first and second GNSS may be any two different GNSS, for example, the United States Global Positioning System (GPS) or other Satellite Positioning System (SPS), such as the Russian GLONASS system, or the proposed European Galileo System. Although, FIG. 1 shows only two GNSSs, the present invention is not limited to two GNSSs. For example, the GNSS 11 may comprise three or more satellite systems, such as GPS, Galileo and GLONASS satellites.

The cellular system 12 includes multiple cellular base stations 22-24 ("base station"), a mobile switching center 25, and a location server, which is otherwise called a position determining entity (PDE) 26. PDE 26 may be a 3GPP SMLC or 3GPP SAS. Each base station 22-24 further includes a base station (BS) transmitter 27, a BS receiver 28, a GPS receiver 29, and a first GNSS receiver (e.g., a GPS receiver) 29, and a second GNSS receiver (e.g., Galileo receiver) 30. Each base station 22-24 may include more GNSS receivers (e.g., an additional GLONASS receiver), which are not shown in FIG. 1. All or some of the GNSS receivers may be located inside or outside the base stations 22-24. The GPS receiver 29 receives signals from the GPS satellites 14-17. The Galileo receiver 35 receives signals from the Galileo satellites 18-21. Similarly, each additional GNSS receiver not shown in FIG. 1 would receive signals from the appropriate GNSS satellites.

The communication system 10 provides wireless communications for the mobile station 31, and is not limited to cellular, fixed wireless, PCS, or satellite communications systems. The communication system 10 may provide for multiple access communications, in accordance with any standard or protocol, such as, for example, CDMA, TDMA, FDMA, or GSM, or combinations thereof.

Global Navigation Satellite System (GNSS) 11

The GNSS system 11 is a collection of satellites, such as GPS satellites 14-17 and Galileo satellites 18-21, each of which travels in a predictable orbit above the earth's surface. Each satellite transmits a signal modulated with a pseudo-noise (PN) code unique to the satellite. Each PN code comprises a predetermined number of chips. For example for GPS Coarse/Acquisition (C/A) code, the PN code is a sequence of 1,023 chips that is repeated every millisecond. A GPS receiver, such as GPS receiver 24, receives a composite signal comprising a mixture of signals from each of the satellites that are visible to the GPS receiver. A signal detector in the receiver detects a transmission from a particular satellite by determining the degree of correlation between the received signal and shifted versions of the PN code for that satellite. If a peak of sufficient quality in the correlation value for one of the shift offsets is detected, the GPS receiver is considered to have detected the transmission from the satellite.

To perform position location for the mobile station 31 in wireless cellular networks (e.g., cellular system 12), several approaches, for example, to perform a position calculation using a number of geometrically distinct measurements, such as range, pseudorange, round trip delay and others that are associated with distinct reference points (e.g., GPS satellites, pseudolites, base stations, surface of the earth).

One approach, called Advanced Forward Link Trilateration (AFLT), Enhanced Observed Time Difference (E-OTD), or Observed Time Difference of Arrival (OTDOA) measures at the mobile station 31 the times of arrival of signals transmitted from each of several base stations (e.g., transmissions from base stations 22-24). These times or time differences are transmitted to a Position Determination Entity (PDE) (e.g., a location server) 26, which computes the position of the mobile station 31 using these times or time differences of reception. The transmit times at these base stations are coordinated or measured such that at a particular instance of time, the times-of-day associated with multiple base stations 22-24 are known and within a specified error bound. The accurate positions of the base stations 22-24 and the times of reception are used to determining the position of the mobile station 31.

In an AFLT system, the times of reception of signals from the base stations 22-24 are measured at the mobile station 31. This timing data may then be used to compute the position of the mobile station 31. Such computation may be done at the mobile station 31 or at the location server 26, if the timing information so obtained by the mobile station 31 is transmitted to the location server 26 via a communication link. Typically, the times of receptions are communicated to the location server 26 through one of the cellular base stations 22-24. The location server 26 is coupled to receive data from the base stations through the mobile switching center 25. The location server 26 may include a base station almanac (BSA) server, which provides the location of the base stations and/or the coverage area of base stations. Alternatively, the location server 26 and the BSA server may be separate from each other, and the location server 26 communicates with the base station to obtain the base station almanac for position determination. The mobile switching center 25 provides signals (e.g., voice, data, and/or video communications) to and from the landline Public Switched Telephone System (PSTS) 13 so that signals may be conveyed to and from the mobile station 31 to other telephones (e.g., landline phones on the PSTS or other mobile telephones). In some cases, the location server 26 may also communicate with the mobile switching center 25 via a cellular link. The location server 26 (which may use associated Location Measurement Units (LMUs)) may also monitor emissions from several of the base stations 22-24 in an effort to determine the relative timing of these emissions.

In another approach, called Uplink Time Difference of Arrival (UTDOA), the times of reception of a signal from the mobile station 31 is measured at several base stations 22-24. This timing data may then be communicated to the location server 26 to compute the position of the mobile station 31.

Yet a third approach of doing position location involves the use in the mobile station 31 of a receiver for the United States Global Positioning System (GPS) or other Satellite Positioning System (SPS), such as the Russian GLONASS system, the proposed European Galileo System, the proposed Chinese Compass/Beidou System, the proposed Indian Regional Navigation System (IRNS), as well as various augmentation systems such as the proposed Japanese Quasi-Zenith Satellite System (QZSS). The existing GLONASS system primarily differs from GPS system in that the emissions from different satellites are differentiated from one another by utilizing slightly different carrier frequencies, rather than utilizing different pseudorandom codes. In this situation, and with the Galileo system, substantially all the circuitry and algorithms described previously are applicable. The term "GNSS" used herein includes such alternative satellite positioning systems, including the Russian GLONASS system and the proposed European Galileo System, and others mentioned or not mentioned above.

In the third approach, the GPS receiver 34 estimates its location by detecting transmissions from some of the satellites 14-17. For each detected transmission, the receiver uses the shift in the PN code to estimate the delay (in terms of chips or fractions of chips) between time of transmission and time of arrival. Given the known propagation speed of the positioning signal, the GPS receiver estimates the distance between itself and the satellite. This estimated distance defines a sphere around the satellite. The GPS receiver 34 knows the precise orbits and positions of each of the satellites, and continuously receives updates to these orbits and positions. From this information, the GPS receiver 34 is able to determine its position (and the current time) from the point where the spheres for the four satellites intersect. In combination with or as alternative to the GPS receiver 34, the Galileo receiver 35 (or any other GNSS receiver) may estimate its location by detecting transmissions from at least four of the satellites 18-21.

Although the methods and apparatus of the present invention have been described with reference to GPS satellites, it will be appreciated that the description are equally applicable to positioning systems which utilize pseudolites, or a combination of satellites and pseudolites. Pseudolites are ground-based transmitters, which broadcast a PN code (similar to a GPS signal) modulated on an L-band carrier signal, generally synchronized with GPS time. Each transmitter may be assigned a unique PN code to permit identification by a remote receiver. Pseudolites are useful in situations where GPS signals from an orbiting satellite might be unavailable, such as tunnels, mines, buildings, or other enclosed areas. The term "satellite", as used herein, is intended to include pseudolites or equivalents of pseudolites, and the term GPS signals, as used herein, are intended to include GPS-like signals from pseudolites or equivalents of pseudolites.

Such a method using a receiver for satellite positioning signals (SPS) signals may be completely autonomous or may utilize the cellular network to provide assistance data or to share in the position calculation. As shorthand, these various methods are referred to as "GPS." Examples of such methods are described in U.S. Pat. Nos. 5,945,944; 5,874,914; 6,208,290; 5,812,087; and 5,841,396.

For instance, U.S. Pat. No. 5,945,944 describes a method to obtain from cellular phone transmission signals accurate time information, which is used in combination with GPS signals to determine the position of the receiver. U.S. Pat. No. 5,874,914 describes a method to transmit the Doppler frequency shifts of in view satellites to the receiver through a communication link to determine the position of the receiver. U.S. Pat. No. 5,874,914 further describes a method to transmit satellite almanac data (or ephemeris data) to a receiver through a communication link to help the receiver to determine its position. U.S. Pat. No. 5,874,914 also describes a method to lock to a precision carrier frequency signal of a cellular telephone system to provide a reference signal at the receiver for GPS signal acquisition. U.S. Pat. No. 6,208,290 describes a method to use an approximate location of a receiver to determine an approximate Doppler for reducing SPS signal processing time. U.S. Pat. No. 5,812,087 describes a method to compare different records of a satellite data message received at different entities to determine a time at which one of the records is received at a receiver in order to determine the position of the receiver.

In practical low-cost implementations, both the MS receiver 33, the GPS receiver 34, and/or the Galileo (or other GNSS) receiver 35 are integrated into the same enclosure and, may in fact share common electronic circuitry, such as receiver circuitry and/or antenna.

In yet another variation of the above methods, the round trip delay (RTD) is found for signals that are sent from the base station 22, 23, or 24 to the mobile station 31 and then are returned to the corresponding base station 22, 23, or 24. In a similar but alternative method, the round trip delay is found for signals that are sent from the mobile station 31 to the base station and then returned to the mobile station 31. The round-trip delays are each divided by two to determine an estimate of the one-way time delay. Knowledge of the location of the base station, plus a one-way delay constrains the location of the mobile station 31 to a circle on the earth. Two such measurements from distinct base stations then result in the intersection of two circles, which in turn constrains the location to two points on the earth. A third measurement (even an angle of arrival or cell sector) resolves the ambiguity.

A combination of another position method such as AFLT or TDOA with a GPS system is called a "hybrid" system. For example, U.S. Pat. No. 5,999,124 describes a hybrid system, in which the position of a cell based transceiver is determined from a combination of at least: i) a time measurement that represents a time of travel of a message in the cell based communication signals between the cell based transceiver and a communication system, and ii) a time measurement that represents a time of travel of an SPS signal.

Altitude aiding has been used in various methods for determining the position of a mobile device. Altitude aiding is typically based on a pseudo-measurement of the altitude. The knowledge of the altitude of a location of a mobile station 31 constrains the possible positions of the mobile station 31 to a surface of a sphere (or an ellipsoid) with its center located at the center of the earth. This knowledge may be used to reduce the number of independent measurements required to determine the position of the mobile station 31. For example, U.S. Pat. No. 6,061,018 describes a method where an estimated altitude is determined from the information of a cell object, which may be a cell site that has a cell site transmitter in communication with the mobile station 31.

When a minimum set of measurements are available, a unique solution to the navigation equations can be determined for the position of the mobile station 31. When more than one extra measurement is available, the "best" solution may be obtained to best fit all the available measurements (e.g., through a least square solution procedure that minimizes the residual vector of the navigation equations). Since the residual vector is typically non-zero when there are redundant measurements, due to the noises or errors in the measurements, an integrity-monitoring algorithm can be used to determine if all the measurements are consistent with each other.

For example, a traditional Receiver Autonomous Integrity Monitoring (RAIM) algorithm may be used to detect if there is a consistency problem in the set of the redundant measurements. For example, one RAIM algorithm determines if the magnitude of the residual vector for the navigation equations is below a threshold value. If the magnitude of the residual vector is smaller than the threshold, the measurements are considered consistent. If the magnitude of the residual vector is larger than the threshold, there is an integrity problem, in which case one of the redundant measurements that appears to cause the most inconsistency may then be removed to obtain an improved solution.

Cellular System 12

Multiple cellular base stations 22-24 are typically arranged to cover a geographical area with radio coverage, and these different base stations 22-24 are coupled to at least one mobile switching center 25, as is well known in the prior art. Thus, multiple base stations 22-24 would be geographically distributed, but coupled by a mobile switching center 25. The cellular system 12 may be connected to a network of reference GPS receivers 29, which provide differential GPS information, and may provide GPS ephemeris data for use in calculating the position of mobile stations. The cellular system 12 may be connected to a network of reference Galileo (or other GNSS) receivers 30, which provide differential Galileo (or other GNSS) information, and may provide Galileo (or other GNSS) ephemeris data for use in calculating the position of mobile stations. The cellular system 12 is coupled through a modem or other communication interface, to other computers or network components, and/or to computer systems operated by emergency operators, such as the Public Safety Answering Points, which respond to 911 telephone calls. In IS-95 compliant CDMA systems, each base station or sector 22-24 transmits a pilot signal, which is modulated with a repeating pseudo-random noise (PN) code, which uniquely identifies that base station. For example, for IS-95 compliant CDMA systems, the PN code is a sequence of 32,768 chips, which is repeated every 26.67 mSec.

The location server 26 typically includes communication devices, such as modems or network interface. The location server 26 may be coupled to a number of different networks through communication devices (e.g., modems or other network interfaces). Such networks include the mobile switching center 25 or multiple mobile switching centers, land based phone system switches, cellular base stations 22-24, other GPS signal receivers, other Galileo receiver, other GNSS receiver, or other processors or location servers. Various examples of methods for using a location server 26 have been described in numerous U.S. Patents, including: U.S. Pat. Nos. 5,841,396, 5,874,914, 5,812,087, and 6,215,442.

The location server 26, which is a form of a data processing system, includes a bus, which is coupled to a microprocessor and a ROM and volatile RAM and a non-volatile memory (each not shown). The processor is coupled to cache memory (not shown). The bus interconnects these various components together. The location server 26 may utilize a non-volatile memory, which is remote from the cellular system 12, such as a network storage device, which is coupled to the data processing system through a network interface such as a modem or Ethernet interface. The bus may include one or more buses connected to each other through various bridges, controllers and/or adapters as are well known in the art. In many situations, the location server 26 may perform its operations automatically without human assistance. In some designs where human interaction is required, an I/O controller (not shown) may communicate with displays, keyboards, and other I/O devices. It will also be appreciated that network computers and other data processing systems which have fewer components or perhaps more components may also be used with the present invention and may act as a location server or a PDE.

Mobile Station 31

A cellular mobile station 31 ("mobile station") includes a first GNSS receiver (e.g., a GPS receiver) 34, and a second GNSS receiver (e.g., Galileo receiver) 35, or a third and additional GNSS receiver (e.g., GLONASS receiver), a mobile station (MS) transmitter 32, and a mobile station receiver 33. The GPS receiver 34 receives signals from the GPS satellites 14-17. The Galileo receiver 35 receives signals from the Galileo satellites 18-21. The MS transmitter 32 transmits communication signals to the BS receiver 28. The MS receiver 33 receives communication signals from the BS transmitter 27.

Other elements of the mobile station 31, which are not shown in FIG. 1, include, for example, a GPS antenna, a Galileo (or other GNSS) antenna, a cellular antenna, a processor, a user interface, a portable power supply, and a memory device. The processor further includes a processor port and other mobile functions.

In the mobile station 31, each satellite signal receiving antenna and satellite signal receiver includes circuitry, such as acquisition and tracking circuitry (not shown), for performing the functions required for receiving and processing satellite signals. Satellite signals (e.g., a signal transmitted from one or more satellites 14-17, and/or 18-21) are received through the satellite antenna and input to acquisition and tracking circuit, which acquires the PN (Pseudorandom Noise) codes for the various received satellites. Data produced by circuit (e.g., correlation indicators (not shown)) are processed by the processor, either alone or in combination with other data received from or processed by the cellular system 12, to produce position location data (e.g., latitude, longitude, time, satellites, etc.)

The cellular antenna and a cellular transceiver (e.g., MS transmitter 32 and MS receiver 33) includes circuitry for performing functions required for processing communication signals received and transmitted over a communication link. The communication link is typically a radio frequency communication link to another component, such as one or more base stations 22-24 having communication antenna (not shown).

The cellular transceiver contains a transmit/receive switch (not shown), which routes communication signals (e.g., radio frequency signals) to and from the communication antenna and the cellular transceiver. In some mobile stations, a band splitting filter, or "duplexer," is used instead of the T/R switch. Received communication signals are input to a communication receiver in the cellular transceiver, and passed to a processor for processing. Communication signals to be transmitted from processor are propagated to a modulator and frequency converter (not shown), each in the transceiver. A power amplifier (not shown) in the cellular transceiver increases the gain of the signal to an appropriate level for transmission to one or more base stations 22-24.

In one embodiment of the mobile station 31, data generated by acquisition and tracking circuitry in the GPS receiver 24 and/or Galileo receiver 35 is transmitted over a communication link (e.g., a cellular channel) to one or more base stations 22-24. The location server 26 then determines the location of mobile station 31 based on the data from one or more satellite receivers 34 and 35, the time at which the data were measured, and ephemeris data received from the base station's own satellite receiver or other sources of such data. The position location data can then be transmitted back to mobile station 31 or to other remote locations. More details about portable receivers utilizing a communication link are disclosed in commonly assigned U.S. Pat. No. 5,874,914.

The mobile station 31 may contain a user interface (not shown), which may further provide a data input device and a data output device (each not shown).

The data input device typically provides data to a processor in response to receiving input data either manually from a user or automatically from another electronic device. For manual input, the data input device is a keyboard and a mouse, but also may be a touch screen, or a microphone and a voice recognition application, for example.

The data output device typically provides data from a processor for use by a user or another electronic device. For output to a user, the data output device is a display that generates one or more display images in response to receiving the display signals from the processor, but also may be a speaker or a printer, for example. Examples of display images include, for example, text, graphics, video, photos, images, graphs, charts, forms, etc.

The mobile station 31 may also contain a memory device (not shown) representing any type of data storage device, such as computer memory devices or other tangible or computer-readable storage medium, for example. The memory device represents one or more memory devices, located at one or more locations, and implemented as one or more technologies, depending on the particular implementation of the mobile station. In addition, the memory device may be any device readable by a processor and capable of storing data and/or a series of instructions embodying a process. Examples of the memory device include, but are not limited to, RAM, ROM, EPROM, EEPROM, PROM, disk (hard or floppy), CD-ROM, DVD, flash memory, etc.

The mobile station 31 may contain a processor (not shown) controlling the operation of the mobile station 31. The other mobile functions in the processor represent any or all other functions of the mobile station 31 that have not already been described herein. Such other mobile functions include, for example, operating the mobile station 31 to permit the mobile station to make telephone calls and communicate data.

The mobile station 31 may contain a portable power supply (not shown), which stores and provides portable electrical energy for the electrical elements of the mobile station 31. Examples of the portable power supply include, but are not limited to, batteries and fuel cells. The portable power supply may be or may not be rechargeable. The portable power supply typically has a limited amount of stored electrical energy, and needs to be replaced or renewed after some amount of use so that the mobile station can continue to operate.

The mobile station 31 may be fixed (i.e., stationary) and/or mobile (i.e., portable). The mobile station 31 may be implemented in a variety of forms including, but not limited to, one or more of the following: a personal computer (PC), a desktop computer, a laptop computer, a workstation, a minicomputer, a mainframe, a supercomputer, a network-based device, a data processor, a personal digital assistant (PDA), a smart card, a cellular telephone, a pager, and a wristwatch.

Position Location Applications

Examples of position location applications include an endless variety of applications on land, sea, and air. The scientific community uses GPS for its precision timing capability and position information. Surveyors use GPS for an increasing portion of their work. Recreational uses of position location are almost as varied as the number of recreational sports available. Position location is popular among hikers, hunters, mountain bikers, and cross-country skiers, just to name a few. Anyone who needs to keep track of where he or she is, to find his or her way to a specified location, or know what direction and how fast he or she is going can utilize the benefits of the global positioning system. Position location is now commonplace in vehicles as well. Some basic systems are in place and provide emergency roadside assistance at the push of a button (e.g., by transmitting your current position to a dispatch center). More sophisticated systems also show the vehicle's position on a street map. Currently these systems allow a driver to keep track of where he or she is and suggest the best route to follow to reach a designated location.

Position location is useful for determining the location of cellular phones in an emergency and for location based services. Deployment of cellular position location in the United States is the result of the Federal Communications Commissions' (FCC) Enhanced 9-1-1 mandate. That mandate requires that for network-based solutions: 100 meters accuracy for 67 percent of calls, 300 meters accuracy for 95 percent of calls; for handset-based solutions: 50 meters for 67 percent of calls, 150 meters for 95 percent of calls. When an emergency call is initiated, an emergency services coordination center—Public Safety Answering Point (PSAP) will make use of the location that is calculated in the MLC. In Europe and Asia deployment is being driven by Location Based Services (LBS), though requirements for emergency service cellular location have been or are being established in these regions.

Global Navigation Satellite System (GNSS)

Assisted-GNSS (A-GNSS), otherwise called "expanded" or "extended" GNSS (E-GNSS), extends the concept to other satellite navigation systems besides GPS. For example, there may be eighty GNSS satellites orbiting the planet within ten years, including GPS, GLONASS, Galileo, and other satellites, all transmitting a variety of signals based on different standards for each system. This will give a receiver (e.g., either mobile or fixed) access to many more satellites and their transmitting signals, which can improve both accuracy and yield of position location determinations. More satellites means that position accuracy is less susceptible to satellite geometry and provides greater redundancy when doing the position calculation.

A simplified GNSS architecture is shown in FIG. 1. A cellular system 12, or other type of wide area reference network (WARN) is a network of GNSS receivers that are placed geographically over the coverage area of the wireless network. The cellular system 12 collects the broadcast navigation message from the GNSS satellites, and provides it to an A-GNSS server (e.g., PDE 26) for caching. A mobile station 31 makes an emergency call or a service is invoked that requires location and a message is sent to the A-GNSS server. The PDE 26 calculates the GNSS assistance data required using the location of one or more base stations 22-24, as the approximate location and provides it to the mobile station 31.

Standards

The different components of an A-GPS server are defined in 3GPP TS 23.271, TS 43.059 and TS 25.305. A Serving Mobile Location Center (SMLC) is deployed as part of a wireless network and its purpose is to determine the location of handsets within the network.

The SMLC runs in GSM/GPRS networks and is known as a Standalone SMLC (SAS) in UMTS networks or a SUPL Location Platform (SLP) when supporting different wireless access types with a user plane solution. The SMLC may support all handset-based and network-based wireless position location methods, including A-GPS in both handset-based and handset-assisted versions.

There are several different specifications (i.e., standards) supporting protocols for the A-GPS messaging with the handsets. GSM networks use the RRLP specification. UMTS networks use the Radio Resource Control (RRC) specification. CDMA networks use the TIA IS-801 and 3GPP2 C.S0022 specifications. Each of these specifications specifies different ways of encoding the same basic information, but is specific to the radio technology employed. Although the present description describes examples (i.e., options) for modifying the RRLP specification, the RRC specification, the IS-801 and C.S0022 specifications or any other specification may be modified to achieve the same or similar effects.

The RRLP specification includes a measure position request message 36 (FIG. 1), which provides positioning instructions and possibly assistance data to the mobile station 31, and a measure position response message 37 (FIG. 1), which provides the mobile station 31 location estimate or pseudo-range measurements from the mobile station 31 to the cellular system 12. The RRC specification, the IS-801/C.S0022 specification or any other specification may include request and/or response messages to achieve the same or similar effects.

Four Options for Modifying a RRLP Position Measure Message

FIG. 2 illustrates Table A representing four options for modifying the RRLP position measure request message 36 (see FIG. 1) and the RRLP position measure response message 37 (see FIG. 1) for the RRLP specification, according to one aspect of the present invention. In Table A, the RRLP position measure request message 36 and the RRLP position measure response message 37 are represented in the present RRLP specification in Tables 1 and 2, respectively. Option 1 provides a modified RRLP position measure request message and a modified RRLP position measure response message in Tables 3 and 4, respectively. Option 2 provides a modified RRLP position measure request message and a modified RRLP position measure response message in Tables 5 and 6, respectively. Option 3 provides a modified RRLP position measure request message and a modified RRLP position measure response message in Tables 7 and 8, respectively. Option 4 provides a modified RRLP position measure request message and a modified RRLP position measure response message in Tables 9 and 10, respectively.

Option 1 introduces Galileo/GNSS, as a new satellite location method.

Option 2 introduces a "GNSS location method" and encapsulates the details of the various constellations (GPS, Galileo, and potential future satellite navigation or augmentation systems) in new GNSS information elements.

Option 3 introduces a "GNSS location method" independent of any Interface Control Document (ICD) of the particular constellation.

Option 4 introduces a combination of advantages of Options 2 and 3, after evaluating and comparing each of Options 1, 2, and 3.

Options 1, 2, and 3 have been described for how Galileo/GNSS could be added to the RRLP specification.

Method for Modifying Measure Position Request and Response Messages

FIG. 3 illustrates a method 38 for modifying the RRLP position measure request message 36 and the RRLP position measure response message 37 for the present RRLP specification in accordance with one of the four options, according to one aspect of the present invention. At block 50 the method 38 starts. At block 51, the method 38 identifies the RRLP measure position request message 36 (e.g., Table 1). At block 52, the method 38 modifies the RRLP measure position request message 36 (e.g., Table 1) according to Option 1 (e.g., Table 3), Option 2 (e.g., Table 5), Option 3 (e.g., Table 7), or Option 4 (e.g., Table 9). At block 53, the method 38 identifies the RRLP measure position response message 37 (e.g., Table 2). At block 54, the method 38 modifies the RRLP measure position response message 37 (e.g., Table 2) according to Option 1 (e.g., Table 4), Option 2 (e.g., Table 6), Option 3 (e.g., Table 8), or Option 4 (e.g., Table 10).

Each of tables 3, 5, 7, and 9 represent a modified RRLP measure position request message for options 1, 2, 3, and 4, respectively, and includes the elements of the present RRLP measure position request message, shown in Table 1, as well as new elements 60 to support a second GNSS system (e.g., Galileo). Each of tables 4, 6, 8, and 10 represent a modified RRLP measure position response message for options 1, 2, 3, and 4, respectively, and includes the elements of the present RRLP measure position response message shown in Table 2, as well as new elements 60 for the GNSS system (e.g., Galileo). Reference number 60 generally identifies the new elements in each of Tables 3-10, although the new elements in each of those tables may be different. In each of Tables 3-10, the present elements are listed first followed by the new elements, although this is not a requirement. Therefore, the beginning of each of Tables 3, 5, 7, and 9 are the same as and includes the elements of Table 1, and the beginning of each of Tables 4, 6, 8, and 10 are the same as and includes the elements of Table 2.

Present RRLP Measure Position Request and Response Messages

FIG. 4 illustrates Table 1 representing the RRLP position measure request message 36 for the present RRLP specification, according to one aspect of the present invention. FIG. 5 illustrates Table 2 representing the RRLP position measure response message 37 for a present RRLP specification, according to one aspect of the present invention.

FIGS. 4 and 5 illustrate the present RRLP measure position request and response messages, respectively, as presently described in the RRLP specification for assisted-GPS (A-GPS), and indicates changes for the introduction of Galileo into the RRLP specification. The RRLP specification (TS 44.031) is the main GERAN specification, which needs to be modified in order to support Galileo/GNSS. The RRLP specification contains the details of the positioning instructions and assistance data elements.

The RRLP specification includes a measure position request message, which provides positioning instructions and possibly assistance data to the mobile station 31, and a measure position response message, which provides the mobile station 31 location estimate or pseudo-range measurements from the mobile station 31 to the cellular system 12.

The changes needed for the introduction of Galileo/GNSS are summarized in the rightmost column of Tables 1 and 2. A blank entry in the rightmost column indicates that no change is required. The changes shown in the rightmost column are not specific to any particular option (i.e., options 1-4), and show which existing A-GPS parameters may be reused or may need to be replaced, extended or otherwise modified. In some cases, more information on Galileo will be needed (e.g. final specifications) before some parameter changes can be finalized.

In each of Tables 1 and 2, as well as Tables 3 to 10, the number of ">" symbols indicates a hierarchical level of a field within the ASN.1 encoding.

Option 1—New Location Method "Galileo"

FIGS. 6 and 7 illustrate Table 3 representing a modified RRLP position measure request message in accordance with option 1, according to one aspect of the present invention. FIGS. 8 and 9 illustrate Table 4 representing a modified RRLP position measure response message in accordance with option 1, according to one aspect of the present invention.

In option 1, new Galileo elements 60 are added to the present RRLP specification, as shown in Table 1, similar to A-GPS. The present A-GPS specific information elements continue to be used, and new Galileo specific information elements 60 are added.

The modifications for the RRLP specification are the introduction of new information elements in e.g., Release 7 extension containers, and are summarized in Table 3 and 4 for the measure position request message and measure position response message, respectively.

Option 1 may be implemented in several ways, and Table 3 and 4 described one example.

Advantages of Option 1 Include the Following;
1. Straightforward evolution of the present RRLP protocol. Existing A-GPS information elements would still be used for combined GPS-Galileo receivers. A-GPS-only receiver would continue to use the existing A-GPS information elements, and Galileo-only receivers would use only or mostly the new added information elements.
2. Backwards compatibility of existing protocols and A-GPS implementations are preserved. Existing A-GPS implementations (SMLC and MS) would not be affected by the introduction of Galileo.
3. Conventional and assisted GNSS modes would not require different user algorithms.

Challenges of Option 1 Include the Following:
1. Assistance data elements are ICD specific. Hence, it may not be possible to define all required Galileo assistance data elements before final Galileo ICD is available.
2. No generic approach. Every time a new GNSS system has to be added, the specification has to be modified accordingly.

Option 2—New Location Method "GNSS"

FIGS. 10 and 11 illustrate Table 5 representing a modified RRLP position measure request message in accordance with option 2, according to one aspect of the present invention. FIGS. 12 and 13 illustrate Table 6 representing a RRLP position measure response message in accordance with option 2, according to one aspect of the present invention.

In option 2, a new location method "GNSS" is introduced, and GPS and/or Galileo specific information elements are encapsulated in GNSS information elements.

The modifications required for the RRLP specification are the introduction of new information elements in e.g., Release 7 extension containers and are summarized in Table 5 and 6 for the measure position request and measure position response message, respectively.

Option 2 may be implemented in several ways, and Table 5 and 6 described one example. The example shown in Table 5 and 6 follows a proposal which assumes that common ASN.1 encoding is possible for GPS and Galileo.

Advantages of Option 2 include the following:
1. Option 2 may result in less additional ASN.1 encoding in RRLP for any new GNSS system provided this is compatible enough with GPS and Galileo to share the same GNSS signaling.
2. Conventional and assisted GNSS modes may not require different user algorithms.

Challenges of Option 2 Include the Following:
1. Two branches are created in RRLP. Present A-GPS implementations would continue to use the existing information elements, and future GPS/Galileo implementations (SMLC and MS) would have to support both the existing A-GPS information elements and the new GNSS information elements. If a terminal and a SMLC are GNSS capable, only the new GNSS information elements may be used even in case of A-GPS only. However, GNSS capable terminals will still have to support the existing A-GPS information elements as well since it cannot be guaranteed that all SMLCs in all networks would support both protocol branches (e.g., assuming GNSS is added to Release 7, then until all SMLCs support Release 7, new Release 7 capable terminals must also support Release 6).
2. A-GPS related information elements are defined twice, in the existing RRLP and in the new GNSS branch.
3. Assistance data elements are ICD specific, but with common ASN.1 encoding. Common ASN.1 encoding may not be feasible.
4. It may be difficult or impossible to add future navigation or augmentation systems using this option, if these future systems are not compatible enough with GPS and Galileo. In that case, it might be necessary to revert to a different option (e.g. option 1 or option 4).

Option 3—New Location Method "GNSS" Independent from any ICD

FIG. 14 illustrates Table 7 representing a modified RRLP position measure request message in accordance with option 3, according to one aspect of the present invention. FIGS. 15 and 16 illustrate Table 8 representing a RRLP position measure response message in accordance with option 3, according to one aspect of the present invention.

Option 3 is similar to option 2 (i.e. a new positioning method "GNSS" is introduced), but the approach is kept generic in terms of structure as well as in terms of constellation data. Assistance data elements and measurement results will not be specific to any ICD.

Instead of using the satellite navigation data as such or re-using and expanding the A-GPS concept, the positioning assistance data are specifically generated for A-GNSS capable terminals. For example, a navigation model will be encoded independent of GPS or Galileo Ephemeris parameters, wherein any orbit model for medium earth orbit (MEO) satellites would suffice. Time is independent of GPS or Galileo time of week (TOW), e.g. universal time coordinate (UTC) could be used, etc.

In RRLP, Option 3 would look similar to Option 2; however, there is no need to explicitly distinguish individual constellations. The different constellations still need to be distinguished somehow, since the GPS/Galileo receiver needs to be enabled to measure the GPS and Galileo specific signals. An example is outlined below in Tables 7 and 8. The details of all added elements need to be newly defined and are not referenced to a particular ICD.

Advantages of Option 3 Include the Following:
1. Generic approach from a protocol point of view. The mobile station receiver would see GPS and Galileo constellations as a single GNSS from the perspective of receiving assistance data and returning measurements.
2. Assistance data elements are not dependent on a specific ICD. Future systems would be supported with minimal or no changes required to the specification.

Challenges of Option 3 Include the Following:
1. Two branches are created in RRLP. Current A-GPS implementations would continue to use the existing information elements, and future GPS-Galileo implementations (SMLC and MS) would have to support both the existing A-GPS information elements and the new GNSS information elements. If a terminal and a SMLC are GNSS capable, only the new GNSS information elements may be used even in case of A-GPS only.

However, GNSS capable terminals will still have to support the existing A-GPS information elements, since it cannot be guaranteed that SMLCs in networks would support both protocol branches (e.g., assuming GNSS is added to Release 7, then until SMLCs support Release 7, new Release 7 capable terminals must also support Release 6).

2. New common orbit models and a new geodetic reference frame may need to be defined to keep this approach truly generic. It may not be possible to use existing A-GPS user algorithms anymore. New GNSS protocol would not be compatible with existing A-GPS implementations.

3. Conventional and Assisted GNSS implementations would be different. Different user algorithms for conventional and assisted mode may be needed. Conventional mode may not be viewed anymore as a special case of assisted mode.

New Option 4—Adding Galileo Using Existing GPS Units and Formats

FIGS. 17 and 18 illustrate Table 9 representing a RRLP position measure request message in accordance with option 4, according to one aspect of the present invention. FIGS. 19 and 20 illustrate Table 10 representing a RRLP position measure response message in accordance with option 4, according to one aspect of the present invention.

One of the challenges of options 2 and 3 is the introduction of a new protocol branch in RRLP, which means that there will be two different protocol formats for the support of A-GPS. Therefore, the introduction of Galileo may also have impacts eventually on A-GPS only implementations. On the other hand, Options 2 and 3 try to be generic and introduce the concept of a "Global Navigation Satellite System (GNSS)." Option 3 has also the advantage that it is independent of a specific ICD; and therefore, future satellite systems would be supported with minimal or no changes required to the specification.

Option 4 describes an alternative approach, which combines the advantages of options 1, 2, and 3, and avoids most of the challenges associated with options 1, 2, and 3.

In Option 4, Galileo or any other GNSS system is added using the existing A-GPS information elements. Instead of defining either new Galileo (or other GNSS) specific information elements (e.g., options 1 and 2) or new GNSS information elements (e.g., option 3), the existing A-GPS information elements are used also for Galileo space vehicles (SV) by introducing new Galileo specific SV-IDs. The existing SV-IDs 1-64 are used for GPS satellites only, and additional SV-IDs, e.g. 65-128 are reserved for Galileo. Sufficient additional SV-IDs are defined to enable future satellite navigation systems being added easily.

Galileo and envisioned future information elements may be converted to meters, seconds, radians, Hz, etc, which in turn can be converted to the existing GPS units and formats. The conversion is based on well defined common assumptions applied the same way in both the sender and receiver of the information elements. Since the existing GPS information element parameters have adequate range to cover any comparable satellite systems, such conversions are possible.

Time dependent assistance data for the new Galileo SV-IDs can either be translated to GPS time (Option 4a—see virtual GNSS time below), or can use Galileo time together with conversion parameters GPS to Galileo time offset (GGTO) (Option 4b). Either the SMLC (Option 4a) or MS (Option 4b) is performing the conversion to a common GPS time frame.

Since the existing SV-ID in the RRLP ASN.1 is not extensible, a new "additional SV-ID" needs to be defined, covering IDs up to e.g., 255 (or 511 or 1023), which allows future GNSSs or augmentation systems to be added. All existing GPS assistance data which are SV dependent are defined in an "Additional Assistance Data" IE applicable for SV-IDs greater than 64. The encoding of the "Additional Assistance Data" IE is exactly the same as the current Assistance Data IEs for GPS. Hence, the impact on existing protocols and implementations is minimal, but the approach is still generic.

Other location protocols such as IS-801-B already have sufficient spare bits for the SV-ID. Hence, an "Additional Assistance Data" IE would not be needed in such location protocols, which even further reduces the impact on existing location protocols and implementations.

There may be several possibilities to implement Option 4. The example illustrated in Tables 9 and 10 may only be one possibility. Some new ASN.1 coding may be avoided by specifying rules for creating RRLP segments. For example, a new constellation ID parameter (or possibly an SV ID increment) can be included in any RRLP component that contains constellation specific data. Data for more than one constellation would then not be included in the same RRLP component. This would enable re-use of existing GPS ASN.1 parameters for any constellation, and avoid defining new ASN.1.

Advantages of Option 4 Include the Following:

1. Generic approach, but still compatible with existing protocol and implementations. User receiver would see GPS and Galileo constellations as a single GNSS (from the perspective of receiving assistance data and returning measurements).
2. Evolution of present protocol. Existing A-GPS information elements would still be used for combined GPS-Galileo receivers.
3. Backward compatibility of existing protocols and A-GPS implementations would be preserved. Existing A-GPS implementations would not be affected by the introduction of Galileo.

Virtual GNSS Time

The present invention further includes a communications system, method and apparatus adapted to handle the different navigation time scales used in GPS and Galileo (or any other satellite navigation or augmentation system).

Aspects of the present invention are described with reference to FIGS. 1 and 21. According to one aspect of the present invention, the location server 26 (e.g., SMLC in 3GPP) is adapted to maintain a "virtual GNSS" time and communicate the virtual GNSS time to the mobile receiver 31. The virtual GNSS time allows the mobile station 31 to "see" the GPS and Galileo constellation as a single Global Navigation Satellite System (GNSS). As such, the mobile station 31 would not need to correct the GPS or Galileo observations for the GGTO. The improvements of the present invention would improve the performance of existing mobile stations and reduce the costs associated with new mobile stations.

Instead of providing the GGTO to the mobile station 31, the location server 26 would take the GGTO into account when providing navigation model and clock correction assistance to the mobile station 31. In operation, the mobile station 31 would not utilize the clock correction from GPS and Galileo broadcast but rather the clock corrections calculated by the location server 26 and referenced to the virtual GNSS time.

Figure 21:
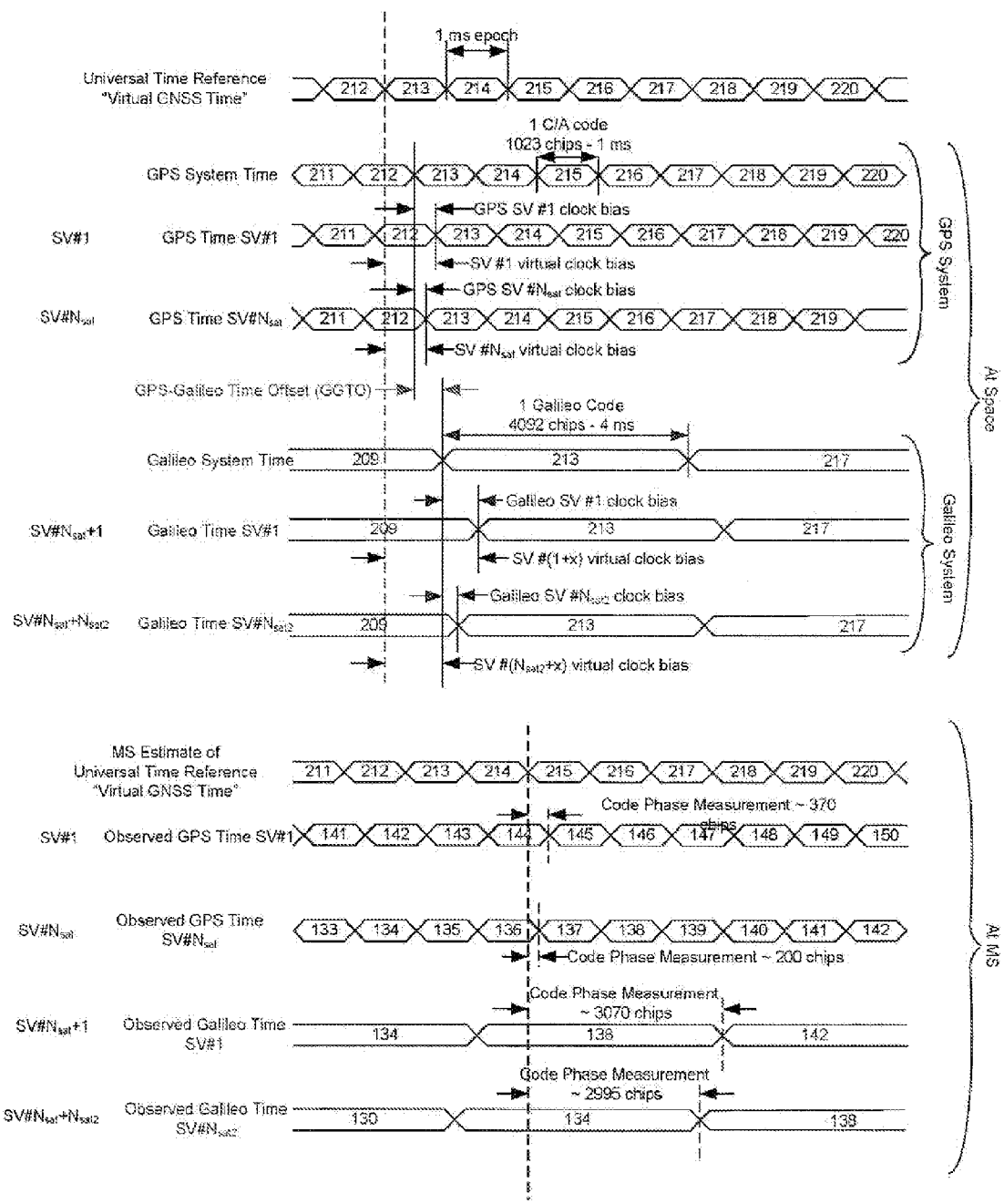
FIG. 21 illustrates a timing diagram for determining a virtual GNSS time in accordance with one aspect of the present invention.

FIG. 21 shows a timing diagram usable in the calculation of the virtual GNSS time. Different regions of FIG. 21 are used to differentiate between different navigation systems. The upper portion of FIG. 21 shows the time at the satellites (e.g. GPS and Galileo), and the lower portion shows the time at the mobile station 31.

As an example, GPS system time is shown as multiples of 1 millisecond. Each GPS satellite has its own clock that has a certain offset from the GPS system time. This offset is shown in FIG. 21 as "GPS SV#1 clock bias" and "GPS SV#$N_{sat}$ clock bias". The GPS clock bias can be calculated at the mobile station 31 using the clock correction parameters received either from the cellular network 12, or obtained by decoding the GPS broadcast navigation message.

The Galileo timing diagram is also shown in the upper portion of FIG. 21. Galileo open service uses 4 milliseconds codes and therefore Galileo System Time is shown as multiples of 4 milliseconds. As in the operation of GPS, each satellite has its own clock that has a certain offset from the Galileo System Time. This offset is shown in FIG. 1 as "Galileo SV#1 clock bias" and "Galileo SV#$N_{sat2}$ clock bias". The Galileo clock bias can be calculated at the mobile station 31 using the Galileo clock correction parameters, as noted above with reference to the GPS clock bias.

As noted above, GPS and Galileo System Time are independent time frames. Hence, there exists an offset between the two system times, denoted as "GPS-Galileo Time Offset (GGTO)" in FIG. 21 and shown between the GPS timelines and the Galileo timelines. In the example of FIG. 21, it is assumed that this GGTO is less than 1 millisecond and further that any integer number of seconds is neglected in the GGTO.

As noted above, a mobile station 31 using GPS and Galileo satellite signal measurements for position calculation would need to have the following inputs: GPS ephemeris and GPS clock correction parameters; Galileo ephemeris and Galileo clock correction parameters; and the GPS-Galileo Time Offset (GGTO).

Fortunately, aspects of the present invention streamline the amount of data received by the mobile station 31 and the amount of processing required by the mobile station 31. Instead of communicating the GGTO to the mobile station 31, the location server 26 can determine the virtual GNSS time and calculate the GPS and Galileo clock correction parameters relative to the virtual GNSS time. The virtual GNSS time can be any appropriate time base, e.g. UTC or cellular time (or as special case, GPS or Galileo time). With the virtual GNSS time the mobile station 31 would not need to distinguish between GPS or Galileo pseudo-range, and would therefore operate uniformly irrespective of the satellite geometries above. The virtual GNSS time as determined by the location server 26 is shown at the top of FIG. 21.

The location server 26 is further adapted to determine the offset between the virtual GNSS time and the GPS and Galileo System times. GNSS clock correction parameters are calculated by the location server 26 by using the known GPS and Galileo Clock Corrections as well as the GGTO and the offset between the virtual GNSS time and GPS or Galileo time.

The lower part of FIG. 1 shows the timing at the user receiver. The MS makes the GPS and Galileo code phase measurements as usual. GPS and Galileo satellites may have a defined SV number such as for example a 3GPP defined SV number. For example, each of the GPS satellites can be numbered #1 to #$N_{sat}$ and each of the Galileo satellites can be numbered #$N_{sat}$+1 to #$N_{sat2}$, which effectively translate to a 3GPP number of satellites SV #1 to $N_{sat}$+$N_{sat2}$. The mobile station 31 can be adapted to recognize which SV number belongs to GPS and Galileo satellites, respectively, to perform the correlations with the correct replica code.

The individual code-phase measurements are converted into satellite transmit time in a conventional manner, which can be used to compute the pseudo-range measurements. The definition of pseudo-range $\rho_i$ to $SV_i$ is defined in equation 1:

$$\rho_i(n) = c(T_R(n) - T_{Ti}(n)) \quad (1)$$

where c is the propagation constant (speed of light), $T_R(n)$ is the receive time corresponding to an epoch n of the receiver's clock, and $T_{Ti}(n)$ is the transmit time based on the $SV_i$ clock.

When the satellite transmitted PRN code reaches the mobile station 31, which is adapted to correlate a replica PRN code with it, the code phase offset of the replica code with respect to the beginning of the GPS or Galileo week represents the transmit time of $SV_i$. Using the example of FIG. 1 (lower part; "At MS"), the code phase measurement to SV#1 ("Observed GPS Time SV#1") is about 370 chips, and the transmit time for this particular satellite is calculated below in equation 2:

$$T_{T_{SV1}} = 145 \text{ ms} - 370 \text{ GPS chips} \quad (2)$$

Similarly, the transmit time for the other 3 satellite measurement examples shown in FIG. 1 are calculated below:

$$T_{T_{SVNsat}} = 137 \text{ ms} - 200 \text{ GPS chips} \quad (3)$$

$$T_{T_{SVNsat+1}} = 142 \text{ ms} - 3070 \text{ Galileo chips} \quad (4)$$

$$T_{T_{SVNsat+Nsat2}} = 138 \text{ ms} - 2995 \text{ Galileo chips} \quad (5)$$

The duration for one GPS or Galileo chip is approximately 977 nanoseconds. The receive time in the example of FIG. 1 is 215 ms, therefore, the approximate pseudo-ranges using this example are shown below:

$$\rho_{SV1} \approx c(215 - 144.6) \approx c \cdot 70.4 \text{ ms} \quad (6)$$

$$\rho_{SVNsat} \approx c(215 - 136.8) \approx c \cdot 78.2 \text{ ms} \quad (7)$$

$$\rho_{SVNsat+1} \approx c(215 - 139) \approx c \cdot 76 \text{ ms} \quad (8)$$

$$\rho_{SVNsat+Nsat1} \approx c(215 - 135.1) \approx c \cdot 79.9 \text{ ms} \quad (9)$$

All satellite transmit times contain a bias error with respect to true GPS or Galileo time, as mentioned above (e.g., "GPS SV#1 clock bias" or "Galileo SV#1 clock bias"). In conventional GPS and/or Galileo receiver processing, the above satellite transmit times are corrected for this GPS and Galileo clock biases in the navigation process using the clock correction parameters obtained from the navigation broadcast message or from cellular assistance data. The pseudo-ranges are usually further corrected for atmospheric delays (e.g., ionosphere and troposphere) and other common biases (e.g., relativistic effects).

Conventional navigation algorithms would then use the GPS or Galileo pseudo-ranges and solve for the three-dimensional position of the mobile station 31 and mobile station 31 clock bias (i.e., offset of the receiver's local clock from GPS or Galileo system time). Accordingly, in conventional combined GPS/Galileo navigation processing (i.e., using GPS plus Galileo pseudo-ranges), the mobile station 31 must handle two receiver clock biases, one relative to GPS time, and one relative to Galileo time. Moreover, in conventional combined GPS/Galileo navigation processing, the pseudo-ranges to GPS and Galileo satellites need to be processed separately at the mobile station 31. Once the pseudo-ranges to GPS and Galileo satellites are corrected for the bias errors (clock corrections and other), the difference between the GPS and Galileo system times have to be taken into account. Either the GPS or Galileo pseudo-ranges have to be corrected for the time offset between the two systems (GGTO) before the GPS and Galileo pseudo-ranges can be used in conventional navigation algorithms.

However, according to the virtual GNSS clock correction parameters described herein, the existing conventional navigation processing can be used for combined GPS/Galileo receivers. Instead of applying GPS clock corrections to GPS pseudo-range measurements, and Galileo clock corrections to Galileo pseudo-range measurements and applying the GGTO to either GPS or Galileo pseudo-ranges, the common GNSS clock corrections are used, and no compensation for GGTO needs to be applied at the mobile station 31. Hence, the existing navigation processing procedures at the mobile station 31 can be used for combined GPS/Galileo measurements. That is, the mobile station 31 would "see" the Galileo pseudo-ranges just as additional GPS pseudo-ranges, or vice versa.

Further details of the present invention are described below with reference to example computations usable in accordance with certain aspects of the present invention.

In the following example, the GPS time of transmission $t_{gps}$ is given by:

$$t_{gps} = t_{sv_igps} - \Delta t_{sv_igps} \quad (10)$$

where $t_{sv_igps}$ is the effective GPS $SV_i$ code phase time at transmission, and $\Delta t_{sv_igps}$ is the GPS $SV_i$ code-phase time offset, calculated using the GPS clock correction parameters ("GPS SV #i clock bias" in FIG. 1). Similarly, the Galileo time of transmission $t_{galileo}$ is given by:

$$t_{galileo} = t_{sv_igalileo} - \Delta t_{sv_igalileo} \quad (11)$$

where $t_{sv_igalileo}$ is the effective Galileo $SV_i$ code phase time at transmission, and $\Delta t_{sv_igalileo}$ is the Galileo $SV_i$ code-phase time offset, calculated using the Galileo clock correction parameters ("Galileo SV #i clock bias" in FIG. 1).

The offset between GPS and Galileo system time (GGTO) is given by:

$$t_{gps} - t_{galileo} = t_{ggto} \quad (12)$$

where the sign of the GGTO is a matter of convention. Instead of providing the mobile station 31 with GPS $\Delta t_{sv_igps}$ and Galileo $\Delta t_{sv_igalileo}$ clock corrections, as well as with the GGTO $t_{ggto}$, location server 26 is adapted to calculate GNSS clock correction parameters $\Delta t_{sv_i}$ relative to a virtual GNSS time $t_{gnss}$ as shown in the below.

The location server 26 is adapted to measure and/or calculate the offset from its own virtual GNSS time and the one or more of the GPS system time or the Galileo system time. As shown below:

$$t_{gps} - t_{gnss} = \Delta t_{gps-gnss} \quad (13)$$

where $\Delta t_{gps-gnss}$ is defined as the offset between the GPS system time and the virtual GNSS time. GNSS specific clock correction parameters can then be calculated by the location server 26 for each of the GPS and Galileo satellites as follows.

For GPS $SV_i$, the location server 26 is adapted to calculate:

$$\Delta t_{sv_i} = \Delta t_{gps-gnss} + \Delta t_{SV_igps} \quad (14)$$

and for Galileo $SV_i$, the location server 26 is adapted to calculate $$\Delta t_{sv_i} = \Delta t_{gps-gnss} + t_{ggto} + \Delta t_{SV_igalileo} \quad (15)$$

where $\Delta t_{sv_i}$ are now virtual GNSS clock corrections. The values for $\Delta t_{SV_igps}$, $\Delta t_{SV_igalileo}$ and $t_{ggto}$ are available at the location server 26 from GPS and Galileo broadcast messages; and the value for $\Delta t_{gps-gnss}$ is determined by the location server 26 as shown above.

The GNSS clock correction parameters $\Delta t_{sv_i}$ can be calculated by the location server 26 for each GPS and Galileo satellite and provided in a form of certain parameters to the mobile station 31 in the assistance data message. For example, the GNSS clock correction parameters can be provided to the mobile station 31 as polynomial coefficients as is customary in both GPS and Galileo data messages.

According to various aspects of the present invention, the mobile station 31 does not directly distinguish between GPS and Galileo satellites in the navigation processing. Both constellations are treated as a single GNSS with respect to pseudo-range calculations. In order to identify one or more satellites in the combined constellation, a standardized GNSS SV ID can be assigned to each GPS and Galileo satellite. For example, GPS satellites can be identified through standardized identifications GNSS SV IDs i=1 to 64, and Galileo satellites can be identified through standardized numbers GNSS SV IDs i=65 to 128. The mobile station 31 can be further adapted to recognize which GPS or Galileo PRN code is used by each GNSS SV ID i.

The mobile station 31 can be further adapted to calculate a GNSS time of transmission for each satellite measurement in the same way as the task is currently performed for a single constellation. Unlike the state of the art, however, the mobile station 31 of the example aspect of the present invention need not directly distinguish between GPS or Galileo transmission times. The GNSS time of transmission can be calculated as follows:

$$t_{gnss} = t_{sv_i} - \Delta t_{sv_i} \quad (16)$$

where $t_{sv_i}$ is the effective GNSS (GPS or Galileo) $SV_i$ code phase time at transmission, and $\Delta t_{sv_i}$ is the GNSS $SV_i$ code-phase time offset, calculated using GNSS clock correction parameters ("SV #i virtual clock bias" in FIG. 21), as defined above.

In another aspect of the present invention, the location server 26 can be adapted to provide the mobile station 31 with assistance data. The assistance data can include for example, the list of visible GNSS SV IDs, corresponding GNSS ephemeris parameters (which could be GPS and Galileo specific parameters), the virtual GNSS time, and GNSS clock corrections, as noted above.

In another aspect of the present invention, the mobile station 31 can be adapted to generate the replica code specific to each GNSS SV ID i and measure the GNSS code phase. The code phase measurements are time tagged with the virtual GNSS time estimate. Since the virtual GNSS time usually can not directly be obtained from the GPS or Galileo signals, it could be provided to the mobile station 31 in the assistance data message as noted above. One suitable approach would be to provide the user receiver with an estimate of the GNSS-cellular time relationship obtained by the location server 26 using for example Location Measurement Units (LMUs) in the network. These LMUs measure the relationship between cellular time and virtual GNSS time and provide these measurements to the location server 26 on a regular basis. Location server 26 maintains a data base of these time relation and provides the GNSS-cellular time relationship to the mobile station 31 in the assistance data message. The LMUs may be dedicated network elements, or mobile stations which have this LMU functionality implemented.

In another aspect of the present invention, the virtual GNSS time can be set to equal GPS or Galileo time. If for example, GPS time is used as the virtual GNSS time, then the calculation of the GNSS clock correction parameters at the location server 26 according to equations (14) and (15) would be simplified. In this example case, the offset between GPS system time and virtual GNSS time $\Delta t_{gps\text{-}gnss}$ would be zero. In this example, only the GPS and Galileo broadcasted clock correction parameters ($\Delta t_{SV,gps}$, $\Delta t_{SV,galileo}$, $t_{ggto}$) would be needed to calculate the GNSS clock corrections at the location server 26, and existing time recovery algorithms at the mobile station 31 could be used to obtain the virtual GNSS time, for example from decoding GPS satellite signals.

Using GPS time as virtual GNSS time would in particular be advantageous when option 4 described above is used for the addition of Galileo (or any other GNSS) in an existing A-GPS location protocol (e.g., RRLP as described above). The existing A-GPS information elements are used to provide Galileo assistance data. Since the Galileo time dependent assistance data are converted to GPS time as described above (i.e., GPS time is used as virtual GNSS time), the existing GPS information elements can be used to convey Galileo related data to the mobile station 31.

By using GPS time as virtual GNSS time together with an existing location protocol for A-GPS (i.e., option 4), GPS and Galileo (or any additional GNSS) are treated as a single navigation satellite system. The mobile station would not need to handle different navigation time frames and would not be affected by GGTO related problems such as those noted above. Galileo (or any other GNSS) satellites would be seen as additional GPS satellites at the mobile station 31. Therefore, the impact on existing A-GPS implementations and standards for support of additional GNSSs would be minimal.

Alternative Implementations

The system, elements, and/or processes contained herein may be implemented in hardware, software, or a combination of both, and may include one or more processors. A processor is a device and/or set of machine-readable instructions for performing task. A processor may be any device, capable of executing a series of instructions embodying a process, including but not limited to a computer, a microprocessor, a controller, an application specific integrated circuit (ASIC), finite state machine, digital signal processor (DSP), or some other mechanism. The processor includes any combination of hardware, firmware, and/or software. The processor acts upon stored and/or received information by computing, manipulating, analyzing, modifying, converting, or transmitting information for use by an executable application or procedure or an information device, and/or by routing the information to an output device.

An executable application comprises machine code or machine readable instruction for implementing predetermined functions including, for example, those of an operating system, a software application program, or other information processing system, for example, in response user command or input.

An executable procedure is a segment of code (i.e., machine readable instruction), sub-routine, or other distinct section of code or portion of an executable application for performing one or more particular processes, and may include performing operations on received input parameters (or in response to received input parameters) and providing resulting output parameters.

In various embodiments, hardwired circuitry may be used in combination with software instructions to implement the present invention. Thus, the techniques are not limited to any specific combination of hardware circuitry and software, nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor.

It will be apparent from this description that aspects of the present invention may be embodied, at least in part, in software. That is, the techniques may be carried out in a computer system or other data processing system in response to its processor executing sequences of instructions contained in a machine-readable medium.

A machine-readable medium includes any mechanism that provides (i.e., stores and/or transmits) information in a form accessible by a machine (e.g., a computer, network device, personal digital assistant, computer, data processor, manufacturing tool, any device with a set of one or more processors, etc.). A machine-readable medium can be used to store software and data which, when executed by a data processing system, causes the system to perform various methods of the present invention. Portions of this executable software and/or data may be stored in various places. For example, a machine-readable medium includes recordable/non-recordable media (e.g., read only memory (ROM), random access memory (RAM), magnetic disk storage media, optical storage media, flash memory devices, non-volatile memory, cache, remote storage device, etc.), as well as electrical, optical, acoustical or other forms of propagated signals (e.g., carrier waves, infrared signals, digital signals, etc.), etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of communication comprising:
providing a location server adapted to communicate with a mobile station, a first satellite, and a second satellite, wherein the first satellite is adapted to operate according to a first specification including a first system time and wherein the second satellite is adapted to operate according to a second specification including a second system time;
defining at the location server a virtual global navigation satellite system (GNSS) time;
receiving at the location server a first signal from the first satellite including a first satellite code phase time;
receiving at the location server a second signal from the second satellite including a second satellite code phase time;
calculating at the location server a GNSS time offset as a function of the virtual GNSS time, the first satellite code phase time and the second satellite code phase time; and
communicating the virtual GNSS time to the mobile station.

2. The method of claim 1 further comprising the step of transmitting the GNSS time offset to the mobile station.

3. The method of claim 2 further comprising the step of determining a position of the mobile station, at the mobile station, in response to a GNSS time of transmission for the first satellite, wherein the GNSS time of transmission is a function of an effective GNSS code phase time at transmission for the first satellite and a GNSS code phase time offset for the first satellite.

4. The method of claim 2 further comprising the step of determining a position of the mobile station, at the mobile station, in response to a GNSS time of transmission for the second satellite, wherein the GNSS time of transmission is a function of an effective GNSS code phase time at transmission for the second satellite and a GNSS code phase time offset for the second satellite.

5. The method of claim 1 further comprising the step of calculating at the location server a GNSS clock correction parameter relative to the virtual GNSS time for each of the first and second satellites.

6. The method of claim 5 further comprising the step of transmitting to the mobile station the GNSS clock correction parameters for the first and second satellites.

7. The method of claim 6 further comprising the steps of:
receiving the GNSS clock correction parameters at the mobile station, and
calculating a GNSS code phase time offset for each of the first and second satellites in response thereto.

8. The method of claim 1 further comprising the step of defining the virtual GNSS time as substantially identical to the first system time.

9. The method of claim 1 further comprising the step of defining the virtual GNSS time as substantially identical to the second system time.

10. The method of claim 1 further comprising the step of identifying the first and second satellites according to a GNSS identification.

11. A communications apparatus comprising:
a location server adapted to:
(a) communicate with a mobile station,
(b) define a virtual global navigation satellite system (GNSS) time,
(c) receive a first signal from a first satellite including a first satellite code phase time, wherein the first satellite is adapted to operate according to a first specification including a first system time,
(d) receive a second signal from a second satellite including a second satellite code phase time, wherein the second satellite is adapted to operate according to a second specification including a second system time,
(e) calculate a GNSS time offset as a function of the virtual GNSS time, the first satellite code phase time and the second satellite code phase time, and
(f) communicate the virtual GNSS time to the mobile station.

12. The apparatus of claim 11 wherein the location server is further adapted to calculate a GNSS clock correction parameter relative to the virtual GNSS time for each of the first and second satellites.

13. The apparatus of claim 12 wherein the location server is further adapted to transmit to the mobile station the GNSS clock correction parameters for the first and second satellites.

14. The apparatus of claim 11 wherein the first signal comprises a Global Position System (GPS) signal.

15. The apparatus of claim 11 wherein the second signal comprises a Galileo satellite system signal.

16. The apparatus of claim 12 wherein the first satellite comprises a first satellite clock, the first satellite clock being offsettable from the first system time resulting in a first satellite clock bias, wherein the location server is further adapted to calculate the GNSS clock correction parameter for the first satellite in response to the first satellite clock bias.

17. The apparatus of claim 12 wherein the second satellite comprises a second satellite clock, the second satellite clock being offsettable from the second system time resulting in a second satellite clock bias, wherein the location server is further adapted to calculate the GNSS clock correction parameter for the second satellite in response to the second satellite clock bias.

18. The apparatus of claim 11 wherein the location server is adapted to define the virtual GNSS time as substantially identical to the first system time.

19. The apparatus of claim 11 wherein the location server is adapted to define the virtual GNSS time as substantially identical to the second system time.

20. The apparatus of claim 11 wherein the location server is adapted to identify the first and second satellites according to a GNSS identification.

21. A communications apparatus comprising:
a mobile station adapted to communicate with a location server, the location server adapted to:
(a) define a virtual global navigation satellite system (GNSS) time,
(b) receive a first signal from a first satellite including a first satellite code phase time, wherein the first satellite is adapted to operate according to a first specification including a first system time,
(c) receive a second signal from a second satellite including a second satellite code phase time, wherein the second satellite is adapted to operate according to a second specification including a second system time, and
(d) calculate a GNSS time offset as a function of the virtual GNSS time, the first satellite code phase time and the second satellite code phase time,
wherein the mobile station is adapted to determine the virtual GNSS time, to receive from the location server the GNSS time offset and to determine a position of the mobile station in response thereto.

22. The apparatus of claim 21 wherein the mobile station is further adapted to determine a position of the mobile station in response to a GNSS time of transmission for the first satellite, wherein the GNSS time of transmission is a function of an effective GNSS code phase time at transmission for the first satellite and a GNSS code phase time offset relative to the virtual GNSS time for the first satellite.

23. The apparatus of claim 21 wherein the mobile station is further adapted to determine a position of the mobile station in response to a GNSS time of transmission for the second satellite, wherein the GNSS time of transmission is a function of an effective GNSS code phase time at transmission for the second satellite and a GNSS code phase time offset relative to the virtual GNSS time for the second satellite.

24. The apparatus of claim 21 wherein the mobile station comprises one of a personal computer (PC), a desktop computer, a laptop computer, a workstation, a minicomputer, a mainframe, a supercomputer, a network-based device, a data processor, a personal digital assistant (PDA), a smart card, a cellular telephone, a pager, or a wristwatch.

25. A computer program product, comprising:
a computer-readable medium comprising:
(a) code to cause at least a location server to communicate with a mobile station,
(b) code to cause at least the location server to define a virtual global navigation satellite system (GNSS) time,
(c) code to cause at least the location server to receive a first signal from a first satellite including a first satellite code phase time, (d) code to cause at least the location server to receive a second signal from a second satellite including a second satellite code phase time, (e) code to cause at least the location server to calculate a GNSS time offset as a function of the virtual GNSS time, the first satellite code phase time and the second satellite code phase time; and (f) code to cause the location server to communicate the virtual GNSS time to the mobile station.

26. The product of claim 25 wherein the computer-readable medium further comprises code to cause at least the location server to calculate a GNSS clock correction parameter relative to the virtual GNSS time for each of the first satellite and the second satellite.

27. The product of claim 26 wherein the computer-readable medium further comprises code to cause at least the location server to transmit to the mobile station the GNSS clock correction parameters for the first and second satellites.

28. The product of claim 25 wherein the first signal comprises a Global Position System (GPS) signal.

29. The product of claim 25 wherein the second signal comprises a Galileo satellite system signal.

30. The product of claim 26 wherein the first satellite comprises a first satellite clock, the first satellite clock being offsettable from the first system time resulting in a first satellite clock bias, and wherein the computer-readable medium further comprises code to cause at least the location server to calculate the GNSS clock correction parameter for the first satellite in response to the first satellite clock bias.

31. The product of claim 26 wherein the second satellite comprises a second satellite clock, the second satellite clock being offsettable from the second system time resulting in a second satellite clock bias, and wherein the computer-readable medium further comprises code to cause at least the location server to calculate the GNSS clock correction parameter for the second satellite in response to the second satellite clock bias.

32. The product of claim 25 wherein the computer-readable medium further comprises code to cause at least the location server to define the virtual GNSS time as substantially identical to the first system time.

33. The product of claim 25 wherein the computer-readable medium further comprises code to cause at least the location server to define the virtual GNSS time as substantially identical to the second system time.

34. The product of claim 25 wherein the computer-readable medium further comprises code for causing at least the location server to identify the first and second satellites according to a GNSS identification.

35. A computer program product, comprising:
a computer-readable medium comprising:
code to cause at least a mobile station to communicate with a location server, wherein the location server is adapted to define a virtual global navigation satellite system (GNSS) time, receive a first signal from a first satellite including a first satellite code phase time, receive a second signal from a second satellite including a second satellite code phase time, and calculate a GNSS time offset as a function of the virtual GNSS time, the first satellite code phase time and the second satellite code phase time;
code to cause the mobile station to determine the virtual GNSS time;
code to cause at least the mobile station to receive from the location server the GNSS time offset; and
code to cause at least the mobile station to determine a position of the mobile station based on the virtual GNSS time and in response to the GNSS time offset.

36. The product of claim 35 wherein the computer-readable medium further comprises code to cause at least the mobile station to determine a position of the mobile station in response to a GNSS time of transmission for the first satellite, wherein the GNSS time of transmission is function of an effective GNSS code phase time at transmission for the first satellite and GNSS code phase time offset for the first satellite.

37. The product of claim 35 wherein the computer-readable medium further comprises code to cause at least the mobile station to determine a position of the mobile station in response to a GNSS time of transmission for the second satellite, wherein the GNSS time of transmission is a function of an effective GNSS code phase time at transmission for the second satellite and a GNSS code phase time offset for the second satellite.

38. The product of claim 35 wherein the mobile station comprises one of a personal computer (PC), a desktop computer, a laptop computer, a workstation, a minicomputer, a mainframe, a supercomputer, a network-based device, a data processor, a personal digital assistant (PDA), a smart card, a cellular telephone, a pager, or a wristwatch.

39. A communications apparatus comprising:
a location server comprising:
(a) means for communicating with a mobile station,
(b) means for defining a virtual global navigation satellite system (GNSS) time,
(c) means for receiving a first signal from a first satellite including a first satellite code phase time,
(d) means for receiving a second signal from a second satellite including a second satellite code phase time,
(e) means for calculating a GNSS time offset as a function of the virtual GNSS time, the first satellite code phase time and the second satellite code phase time; and
(f) means for communicating the virtual GNSS time to the mobile station.

40. The apparatus of claim 39 wherein the location server further comprises means for calculating a GNSS clock correction parameter for each of the first satellite and the second satellite.

41. The apparatus of claim 40 wherein the location server further comprises means for transmitting to the mobile station the GNSS clock correction parameters for the first and second satellites.

42. A communications apparatus comprising:
a mobile station comprising:
means for communicating with a location server, wherein the location server is adapted to define a virtual global navigation satellite system (GNSS) time, receive a first signal from a first satellite including a first satellite code phase time, receive a second signal from a second satellite including a second satellite code phase time, and calculate a GNSS time offset as a function of the virtual GNSS time, the first satellite code phase time and the second satellite code phase time;
means for receiving from the location server the GNSS time offset;
means for determining the virtual GNSS time; and means for determining a position of the mobile station at the mobile station based on the virtual GNSS time and in response to the GNSS time offset.

43. The apparatus of claim 42 wherein the mobile station further comprises means for determining a position of the mobile station in response to a GNSS time of transmission for the first satellite, wherein the GNSS time of transmission is a function of an effective GNSS code phase time at transmission for the first satellite and a GNSS code phase time offset for the first satellite.

44. The apparatus of claim 42 wherein the mobile station further comprises means for determining a position of the mobile station in response to a GNSS time of transmission for the second satellite, wherein the GNSS time of transmission is a function of an effective GNSS code phase time at transmission for the second satellite and a GNSS code phase time offset for the second satellite.

* * * * *